(12) United States Patent
Mochizuki

(10) Patent No.: US 7,132,694 B2
(45) Date of Patent: Nov. 7, 2006

(54) ELECTRO-OPTICAL DEVICE, METHOD FOR FABRICATING THE SAME, AND ELECTRONIC APPARATUS

(75) Inventor: Hiroaki Mochizuki, Chino (JP)

(73) Assignee: Seiko Epson Corporation, Tokyo (JP)

( * ) Notice: Subject to any disclaimer, the term of this patent is extended or adjusted under 35 U.S.C. 154(b) by 21 days.

(21) Appl. No.: 10/927,003

(22) Filed: Aug. 27, 2004

(65) Prior Publication Data

US 2005/0017279 A1    Jan. 27, 2005

Related U.S. Application Data

(62) Division of application No. 10/247,580, filed on Sep. 20, 2002, now abandoned.

(30) Foreign Application Priority Data

Sep. 21, 2001   (JP)   ............... 2001-289011
Jul. 23, 2002   (JP)   ............... 2002-214150

(51) Int. Cl.
   *H01L 29/205*   (2006.01)
   *H01L 33/00*   (2006.01)

(52) U.S. Cl. ............... 257/91; 257/59; 257/83; 257/88; 257/98; 257/257

(58) Field of Classification Search ............... 257/91, 257/88, 98, 83, 59, 257
See application file for complete search history.

(56) References Cited

U.S. PATENT DOCUMENTS

| | | | |
|---|---|---|---|
| 5,784,132 A | 7/1998 | Hashimoto | |
| 6,078,368 A * | 6/2000 | Ichikawa et al. | ............... 349/48 |
| 6,172,721 B1 * | 1/2001 | Murade et al. | ............... 349/43 |
| 6,476,889 B1 | 11/2002 | Urabe et al. | |
| 6,563,558 B1 | 5/2003 | Koma | |
| 2002/0015031 A1 | 2/2002 | Fujita et al. | |

FOREIGN PATENT DOCUMENTS

| | | | |
|---|---|---|---|
| JP | 02 -144525 | 6/1990 | |
| JP | 07-092318 | 4/1995 | |
| JP | A-10-031228 | 2/1998 | |
| JP | 63-062358 | 3/1998 | |
| JP | A-10-68811 | 3/1998 | |
| JP | 10-104600 | 4/1998 | |
| JP | A-10-133011 | 5/1998 | |
| JP | A-11-038906 | 2/1999 | |
| JP | 2000-305472 | * 4/1999 | |
| JP | A-2000-221541 | 8/2000 | |
| JP | A-2000-294791 | 10/2000 | |
| JP | A-2000-330133 | 11/2000 | |

(Continued)

*Primary Examiner*—Evan Pert
*Assistant Examiner*—Victor A. Mandala, Jr.
(74) *Attorney, Agent, or Firm*—Oliff & Berridge, PLC

(57) ABSTRACT

An electro-optical device includes a pair of substrates including a first substrate and a second substrate, an electro-optical material sandwiched between the pair of substrates, a shading film having a predetermined pattern which is at least partially embedded in the first substrate at the surface facing the electro-optical material, display electrodes which are placed on the second substrate at the surface facing the electro-optical material, and lines connected to the display electrodes directly or through switching elements. In accordance with the electro-optical device having such a shading film, it is possible to reduce or prevent coating defects in an alignment layer, nonuniform rubbing treatment to the alignment layer, and cracking of a counter electrode due to the steps in the upper layers resulting from the formation of the shading film.

14 Claims, 12 Drawing Sheets

FOREIGN PATENT DOCUMENTS

| | | |
|---|---|---|
| JP | A-2000-338506 | 12/2000 |
| JP | A-2001-0222884 | 1/2001 |
| JP | 2001-083548 | 3/2001 |
| JP | 2001-091961 | 4/2001 |
| JP | 2001-100019 | 4/2001 |
| JP | 2001-183646 | 7/2001 |
| JP | A-2001-242443 | 9/2001 |

* cited by examiner

SINGLE-LAYERED STRUCTURE
COMPOSED OF ONLY ONE MATERIAL

TWO-LAYERED STRUCTURE COMPOSED
OF TWO MATERIALS

THREE-LAYERED STRUCTURE COMPOSED
OF THREE MATERIALS

LIGHT INCIDENT SIDE (a)

(b)

(c)

(d)

(a)

(b)

ELECTRO-OPTICAL DEVICE, METHOD FOR FABRICATING THE SAME, AND ELECTRONIC APPARATUS

CROSS-REFERENCE TO RELATED APPLICATIONS

This is a division of U.S. patent application Ser. No. 10/247,580 filed Sep. 20, 2002 now abandoned. The entire disclosure of the prior application is hereby incorporated by reference herein in its entirety.

BACKGROUND OF THE INVENTION

1. Field of Invention

The present invention relates to an electro-optical device including a pair of substrates which sandwich an electro-optical material, such as liquid crystal. More particularly, the invention relates to an electro-optical device in which a shading film is provided on one of the substrates, such as a counter substrate, and the shading film delimits the aperture regions for the individual pixels.

2. Description of Related Art

Electro-optical devices, such as liquid crystal devices, exist in the related art. One type of such a device is an active matrix liquid crystal device in which thin-film transistors (hereinafter "TFTs") for switching pixels are provided. In such a liquid crystal device, pixel electrodes are formed on a TFT array substrate provided with the TFTs, and a counter electrode is formed on a counter substrate which faces the TFT array substrate. While a plurality of pixel electrodes are arrayed in a matrix on the TFT array substrate, the counter electrode is formed uniformly over the entire surface of the counter substrate. Additionally, the TFTs are provided so as to correspond to the individual pixel electrodes. Alignment layers are generally provided on the pixel electrodes and the counter electrode, and a liquid crystal is interposed between the upper and lower alignment layers.

In such an electro-optical device, a shading film, which is referred to as a black matrix (BM) or black mask, formed of metallic chromium (Cr) or the like, is formed in a predetermined pattern, such as in a grid pattern or in a striped pattern, on the surface of the counter substrate on which the counter electrode is to be formed, namely, between the counter electrode and the counter substrate, so as to delimit the aperture regions of the individual pixels (i.e., the regions from which light actually contributing to display is emitted due to transmission or reflection), in other words, so as to delimit the non-aperture regions of the individual pixels (i.e., the regions, other than the aperture regions, from which light actually contributing to display is not emitted due to transmission or reflection). The shading film reduces or prevents light from leaking through the spaces between the pixels. As a result, the image contrast can be enhanced, and when a color filter is provided, color mixing can be reduced or prevented.

Additionally, the related art includes a technique for forming such a shading film, which delimits the aperture regions of the individual pixels, partially or entirely on the TFT array substrate as a so-called embedded shading film. The related art also includes a technique for constructing a shading film partially from the data lines, etc., on the TFT array substrate.

SUMMARY OF THE INVENTION

However, when a shading film pattern is formed on a counter substrate as described above and a counter electrode and an alignment layer are formed thereon, since the shading film pattern has a predetermined height, steps occur in the counter electrode and the alignment layer corresponding to the sections at which the shading film pattern is formed. Therefore, it is difficult to perform uniform rubbing treatment on the alignment layer. There are also problems, such as the occurrence of cracking in the counter electrode at the steps, and coating defects in the alignment layer.

Moreover, recently, as electro-optical devices are miniaturized, the gap to form the liquid crystal layer tends to be decreased (for example, to approximately 2 μm), and if the step height is excessive, it is not possible to secure a proper "thickness" for the liquid crystal layer. The presence of the steps is also problematic in this respect.

Additionally, recently, in order to fabricate an electro-optical device having higher shading performance, a multi-layered shading film, for example, in which a high reflectance layer is used for the light incident side and a low reflectance layer is used for the reverse side, has been used in the related art. The height of the shading film pattern has inevitably increased, and the step height has also increased. Therefore, the problems described above have become serious. For example, the gap to form the liquid crystal layer is approximately 2 μm and the height of the shading film pattern is approximately 400 to 500 nm.

The present invention addresses the problems described above, and provides an electro-optical device in which a shading film having a predetermined pattern is incorporated in a substrate, such as a counter substrate, and the undesirable effects of steps or irregularities due to the presence of the shading film can be effectively reduced or prevented, and provides an electronic apparatus including the electro-optical device.

A first electro-optical device of the present invention includes a pair of substrates including a first substrate and a second substrate, an electro-optical material sandwiched between the pair of substrates, a shading film having a predetermined pattern which is at least partially embedded in the first substrate at the surface facing the electro-optical material, display electrodes which are placed on the second substrate at the surface facing the electro-optical material, and switching elements provided at positions corresponding to the display electrodes.

In accordance with the first electro-optical device of the present invention, an electro-optical material, such as a liquid crystal, is sandwiched between the first substrate, for example, a counter substrate, and the second substrate, for example, a TFT array substrate. During operation, by supplying signals, such as image signals, from lines through the switching elements or directly to the display electrodes formed on the second substrate, it is possible to drive the electro-optical material. The shading film having the predetermined pattern can delimit, for example, the aperture regions of the individual pixels, and thus a high contrast ratio can be achieved and color mixing can be reduced or prevented.

Such a shading film is at least partially embedded in the first substrate, for example, the counter substrate at the surface facing the electro-optical material. Consequently, it is possible to reduce the height of the steps or irregularities resulting from the presence of the shading film by an amount substantially the same as the embedding depth. Therefore, various undesirable effects of such steps or irregularities can be effectively reduced or prevented. Examples of the various undesirable effects include the difficulty in performing rubbing treatment uniformly on the alignment layer on the first substrate, the occurrence of cracking in the counter electrode on the first substrate, and coating defects in the alignment layer on the first substrate. Moreover, it is possible to decrease the thickness of the electro-optical material layer by about the same amount of the reduction of the steps or irregularities, and therefore it is possible to cope with the miniaturization of the electro-optical device.

As described above, in accordance with the first electro-optical device of the present invention, while the shading film having the predetermined pattern is incorporated in the first substrate, such as a counter substrate, the undesirable effects resulting from the presence of the shading film can be effectively reduced or prevented.

Additionally, "the shading film . . . which is at least partially embedded" of the present invention means that at least a part of the shading film in the height direction is embedded. That is, when the surface of the first substrate is considered as "the surface facing the electro-optical material" of the present invention, "the shading film which is at least partially embedded" means that the edges of the shading film slightly protrude from the substrate surface. Consequently, the shading film which is totally embedded means that the edges of the shading film are flush with the substrate surface. Either case is acceptable in the present invention.

"The shading film . . . which is at least partially embedded" of the present invention also means that the shading film is at least embedded in "the surface" of the present invention at least in some regions among the entire surface of the substrate. That is, in such a case, in the plane of the surface, the shading film is embedded in some regions, and the shading film is not embedded in the other regions. Consequently, the shading film which is totally embedded means that the shading film is totally embedded over the entire surface. Either case is acceptable in the present invention.

In an embodiment of the first electro-optical device of the present invention, a planarizing layer is formed flush with the surface of the shading film on the first substrate or at a higher level than the shading film.

In such a construction, since the shading film is at least partially embedded in the first substrate and also the planarizing layer is formed flush with the surface of the shading film or at a higher level than the shading film, it is possible to reduce the height of the steps or irregularities resulting from the presence of the shading film by an amount substantially the same as the embedding depth and by an amount substantially the same as the amount of planarizing. Consequently, various undesirable effects of such steps or irregularities can be effectively reduced or prevented. Moreover, it is possible to decrease the thickness of the electro-optical material layer by an amount substantially the same as the reduction in the height of the steps or irregularities, and therefore it is possible to cope with the miniaturization of the electro-optical device.

In another embodiment of the first electro-optical device of the present invention, an alignment layer is formed as an uppermost layer to the shading film.

In such a construction, in the first substrate in which the shading film is at least partially embedded, which results in the prevention of the undesirable effects due to the steps or irregularities, since the alignment layer is formed as the uppermost layer, coating defects do not occur when the alignment layer is formed by coating, and rubbing treatment can be performed uniformly on the surface of the alignment layer after coating the alignment layer.

A second electro-optical device of the present invention includes a pair of substrates including a first substrate and a second substrate, an electro-optical material sandwiched between the pair of substrates, a shading film having a predetermined pattern which is formed on the first substrate at the surface facing the electro-optical material, display electrodes which are placed on the second substrate at the surface facing the electro-optical material, switching elements provided at positions corresponding to the display electrodes, and a planarizing layer formed flush with the surface of the shading film on the first substrate or at a higher level than the shading film.

In accordance with the second electro-optical device of the present invention, an electro-optical material, such as a liquid crystal, is sandwiched between the first substrate, for example, a counter substrate, and the second substrate, for example, a TFT array substrate. During the operation, by supplying signals, such as image signals, from lines through the switching elements or directly to the display electrodes formed on the second substrate, it is possible to drive the electro-optical material. The shading film having the predetermined pattern can delimit, for example, the aperture regions of the individual pixels, and thus a high contrast ratio can be achieved and color mixing can be reduced or prevented.

In particular, the planarizing layer is formed flush with the surface of the shading film or at a higher level than the shading film on the first substrate, for example, a counter substrate. Accordingly, it is possible to reduce the height of the steps or irregularities resulting from the presence of the shading film by an amount substantially the same as the amount of planarizing. Consequently, various undesirable effects of such steps or irregularities can be effectively reduced or prevented. Moreover, it is possible to decrease the thickness of the electro-optical material layer by an amount substantially the same as the amount of reduction in the steps or irregularities, and therefore it is possible to cope with the miniaturization of the electro-optical device.

As described above, in accordance with the second electro-optical device of the present invention, while the shading film having the predetermined pattern is incorporated in the first substrate, such as a counter substrate, undesirable effects resulting from the presence of the shading film can be effectively reduced or prevented.

In an embodiment of the electro-optical device of the present invention, the planarizing layer is formed by chemical mechanical polishing (CMP).

In such a construction, since the planarizing layer is obtained by CMP, undesirable effects resulting from the steps or irregularities can be more reliably reduced or prevented. Herein, CMP is a technique in which the surfaces of a substrate and a polishing cloth (pad) are brought into contact with each other while both the substrate and the polishing cloth are rotated or the like, and simultaneously, a polishing liquid (slurry) is supplied to the contact section, and thus the surface of the substrate is planarized by polishing, taking advantages of the synergistic effect of both mechanical and chemical actions.

In another embodiment of the present invention, the planarizing layer is a spin-on-glass (SOG) film.

In such a construction, since the planarizing layer is composed of a SOG film, undesirable effects resulting from the steps or irregularities can be more reliably reduced or prevented. Herein, the SOG film is obtained by a technique in which an appropriate organic liquid or the like is applied to a substrate while rotating the substrate so that the liquid produces a horizontal surface, and then by solidifying the liquid, a planarized surface is obtained.

In another embodiment of the present invention, the electro-optical device further includes a color filter and an overcoat layer formed on top of the color filter, the color filter and the overcoat layer being placed on the first substrate above or below the shading film, and the surface of the overcoat layer is planarized.

In such a construction, when the color filter, etc., is provided above the shading film, the overcoat layer can be used as a planarizing layer which planarizes the steps or irregularities produced by the pattern of the shading film. When the color filter, etc., is provided below the shading film, the shading film can be formed on the flat underlayer composed of the overcoat layer.

In any case, in such a construction, it is possible to reduce or prevent undesirable effects resulting from the steps or irregularities in the electro-optical device provided with the color filter. In such a construction, it is also obvious that the shading film can reduce or prevent color mixing.

In another embodiment of the present invention, the shading film is placed in a recess formed in the first substrate.

In such a construction, by placing the shading film in the recess formed in the first substrate, the shading film can be embedded in the substrate, and planarizing treatment can be performed on the layer above the shading film. Moreover, such a construction can be relatively easily obtained by forming a recess having a predetermined pattern by etching treatment or the like in the first substrate.

Alternatively, in another embodiment of the present invention, the shading film is placed in a recess formed in an interlayer insulating film formed on the first substrate.

In such a construction, by placing the shading film in the recess formed in the interlayer insulating film, the shading film can be embedded in the substrate, and planarizing treatment can be performed on the layer above the shading film. Moreover, such a construction can be relatively easily obtained by forming a recess with a predetermined pattern by etching treatment or the like in the interlayer insulating film.

In another embodiment of the present invention, an overcoat layer is formed on top of the shading film.

In such a construction, since the overcoat layer formed on top of the shading film is the most appropriate layer on which planarizing treatment is performed, planarization can be performed more reliably, and also undesirable effects resulting from the steps or irregularities can be reduced or prevented.

In another embodiment of the present invention, the electro-optical device further includes an alignment layer as an outermost layer on the first substrate.

In such a construction, the state of the electro-optical material, such as a liquid crystal, can be aligned by the alignment layer. Particularly, in the underlayer for the alignment layer, since the height of steps or irregularities is reduced because of embedding of the shading film or planarization treatment, the alignment layer can be formed satisfactorily by coating, and also rubbing treatment can be performed uniformly on the alignment layer.

Additionally, the present invention is also applicable to an electro-optical device in which the first substrate is not provided with an alignment layer.

In another embodiment of the present invention, the electro-optical device further includes another display electrode which is placed on the first substrate at the surface facing the electro-optical material.

In such a construction, the electro-optical material, such as a liquid crystal, can be driven by a pair of display electrodes. In such a case, the combination of the pair of display electrodes may include a pixel electrode and a solid counter electrode or a rectangular display electrode, or may include electrode strips which intersect each other. Particularly, in the underlayer for the display electrode on the first substrate, since the height of steps or irregularities is reduced because of embedding of the shading film or planarization treatment, cracking can be reduced or prevented in the display electrode.

Additionally, the present invention is also applicable to an electro-optical device in which the first substrate is not provided with a display electrode.

In this embodiment, the display electrode on the first substrate may be a transparent counter electrode formed over the entire image display region.

In such a construction, cracking in the transparent counter electrode formed of an ITO film or the like can be effectively reduced or prevented.

In another embodiment of the present invention, the electro-optical device further includes microlenses provided on the first substrate.

In such a construction, since light can be focused in the beam-condensing regions on the display electrode, utilization of the incident light can be enhanced. In particular, in this embodiment, it is possible to achieve such an effect while simultaneously eliminating the undesirable effects of steps or irregularities.

In another embodiment of the present invention, the shading film includes a plurality of layers.

In this embodiment, since the shading film includes a plurality of layers, the shading performance of the shading film can be enhanced. For example, a high reflectance material may be used for the light incident side and a low reflectance layer may be used for the light-emitting side. When a multilayered shading film is formed, the "height" of the multilayered shading film is generally larger than that of a single-layer shading film. However, in this embodiment, even if the "height" of the shading film is increased because of the multilayered structure, since the shading film is embedded in the first substrate or the height of steps or irregularities is decreased by planarization treatment, a planarized surface can be obtained. The embodiment may be more effective in the case in which such a shading film having a large "height" is used?

In this embodiment, if the plurality of layers are formed of an aluminum layer, a chromium layer, and a chromium oxide layer, the shading performance can be further enhanced.

In order to address or overcome the problems described above, a first method for fabricating an electro-optical device of the present invention includes: forming a shading film having a predetermined pattern which is at least partially embedded in a first substrate at a surface to be facing an electro-optical material, forming display electrodes on a second substrate at a surface to be facing the electro-optical material, forming switching elements corresponding to the display electrodes, bonding the first substrate and the second substrate with each other around the peripheries thereof, and injecting the electro-optical material into the space between the bonded first and second substrates.

In accordance with the first method for fabricating the electro-optical device, the first electro-optical device of the present invention described above (including the various embodiments thereof) can be fabricated relatively easily.

In order to address or overcome the problems described above, a second method for fabricating an electro-optical device of the present invention includes: forming a shading film having a predetermined pattern on a first substrate at a surface to be facing an electro-optical material, performing planarization treatment on the same plane as the surface of the shading film on the first substrate or on the level above the shading film, forming display electrodes on a second substrate at a surface to be facing the electro-optical material, forming switching elements corresponding to the display electrodes, bonding the first substrate and the second substrate with each other around the peripheries thereof, and injecting the electro-optical material into the space between the bonded first and second substrates.

In accordance with the second method for fabricating the electro-optical device of the present invention, the second electro-optical device of the present invention described above (including the various embodiments thereof) can be fabricated relatively easily.

Finally, in accordance with electronic apparatuses of the present invention, since the electronic apparatuses include the electro-optical devices described above, it is possible to provide various types of electronic apparatuses which can display bright images with high contrast and high resolution, such as liquid crystal televisions, mobile phones, electronic pocket diaries, word processors, viewfinder type or monitor-direct-view type video tape recorders, workstations, television telephones, POS terminals, and touch panels, for example.

The effects and other advantages of the present invention will be clarified by the embodiments which will be described below.

DETAILED DESCRIPTION OF PREFERRED EMBODIMENTS

The embodiments of the present invention will be described below with reference to the drawings.

(Overall Structure of Electro-optical Device)

First, the overall structure of an electro-optical device in a first embodiment of the present invention will be described with reference to FIGS. 1 and 2. Herein, as an example of an electro-optical device, a TFT active matrix liquid crystal device with built-in drive circuits are described below.

Figure 1:
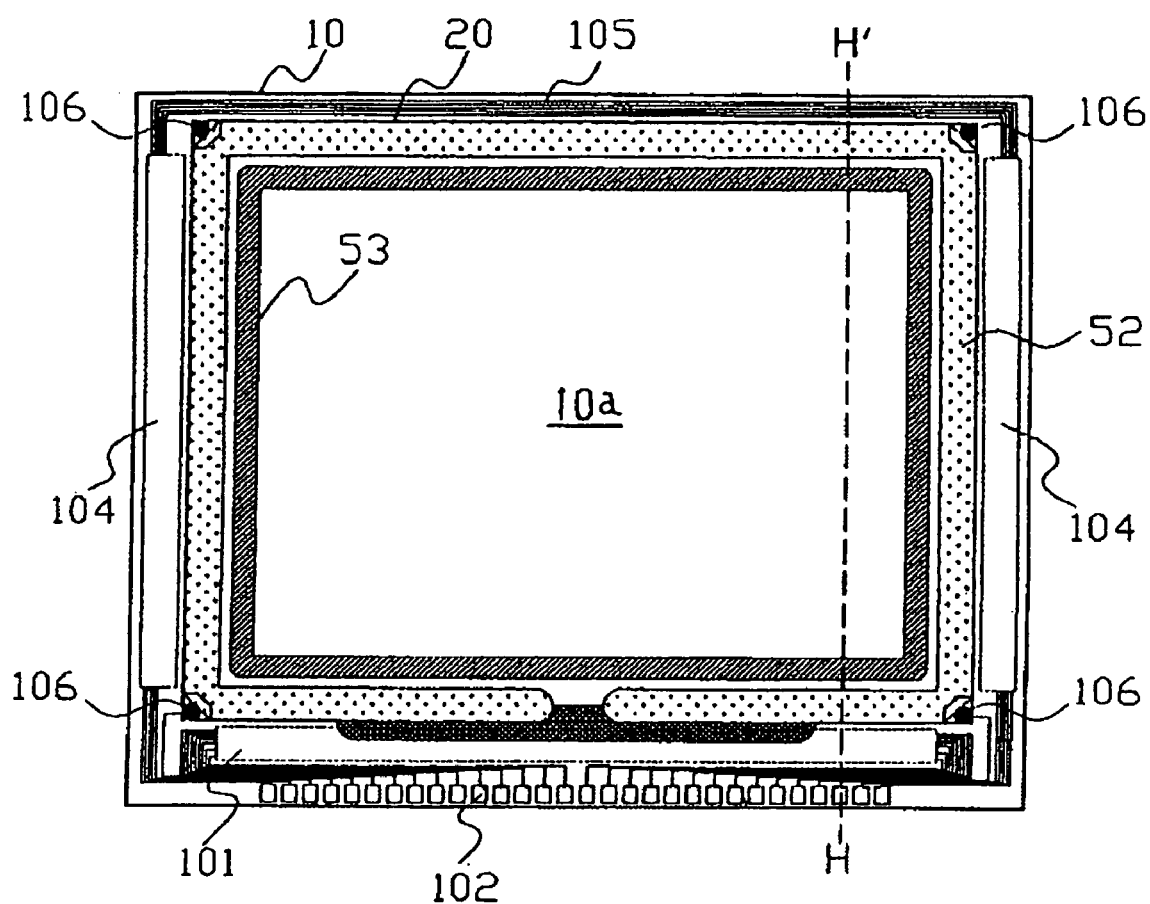
FIG. 1 is a plan view of a TFT array substrate and elements formed thereon in an electro-optical device in an embodiment of the present invention, viewed from the counter substrate side.
Figure 2:
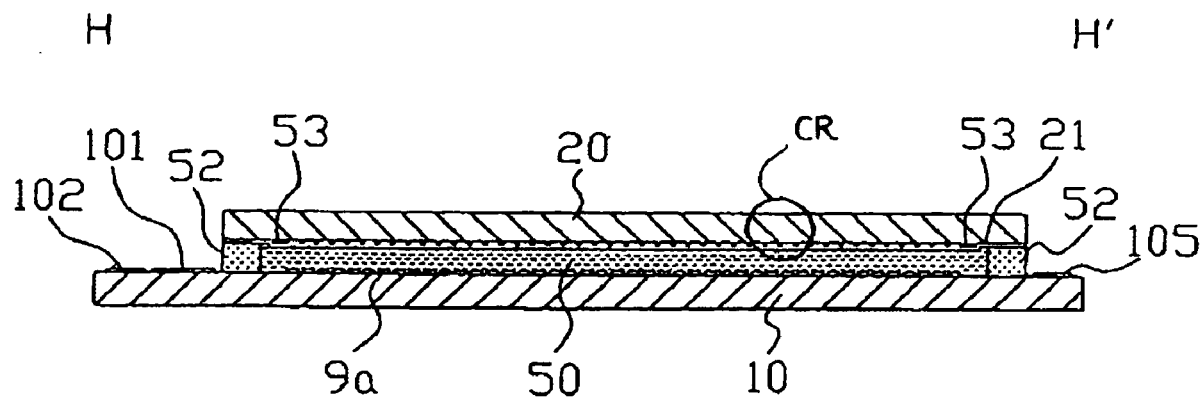
FIG. 2 is a sectional view taken along plane H–H' of FIG. 1.

FIG. 1 is a plan view of a TFT array substrate and elements formed thereon, viewed from the counter substrate side, and FIG. 2 is a sectional view taken along plane H–H' of FIG. 1.

As shown in FIGS. 1 and 2, in the electro-optical device in the first embodiment, a TFT array substrate 10, in which various elements, such as TFTs 30 and storage capacitors 70, which will be described below, are provided on a TFT array substrate body, and a counter substrate 20, in which various elements, such as a shading film 500 and a counter electrode 21, which will also be described below, are provided on a counter substrate body, are placed so as to face each other.

In this embodiment, "the first substrate" of the present invention corresponds to "the counter substrate body".

A liquid crystal layer 50 is enclosed between the TFT array substrate 10 and the counter substrate 20, and the TFT array substrate 10 and the counter substrate 20 are bonded with each other by a sealant 52 provided in the sealing region located in the periphery of an image display region 10a. The sealant 52 is formed of, for example, a thermosetting resin, a thermosetting and photo-curable resin, a photo-curable resin, or UV curable resin, and after the resin is applied onto the TFT array substrate 10 in the fabrication process, the resin is hardened by heating only, heating and irradiation, irradiation only, UV irradiation only, or the like.

A gap material, for example, glass fibers or glass beads, is mixed in the sealant 52 in order to maintain a predetermined gap between the substrates. That is, the electro-optical device in this embodiment is suitable for use as a light valve for a compact projector which produces a magnified display. However, if the electro-optical device is used as a large liquid crystal device, such as a liquid crystal display or a liquid crystal television, which produces a display with a magnification factor of 1, such a gap material may be contained in the liquid crystal layer 50.

As shown in FIGS. 1 and 2, a frame-shaped shading film 53 to determine the periphery of the image display region 10a is provided along the inner sides of the sealing region on the counter substrate 20. However, a part or the entirety of such a frame-shaped shading film 53 may be incorporated in the TFT array substrate 10.

A data line drive circuit 101, which drives data lines 6a by supplying image signals at a predetermined timing, and external circuit connection terminals 102 are provided along one side of the TFT array substrate 10 outside the sealant 52. Scanning line drive circuits 104, which drive scanning lines 3a by supplying scanning signals at a predetermined timing, are provided along two sides adjacent to the side described above.

If delays in scanning signals supplied to the scanning lines 3a present no problem, the scanning line drive circuit 104 may be formed on one side only. Data line drive circuit 101 may be placed along both sides of the image display region 10a.

A plurality of lines 105 for connecting the scanning line drive circuits 104 provided on both sides of the image display region 10a are formed along the remaining side of the TFT array substrate 10. A conductive member 106 is provided on at least one corner out of four corners of the counter substrate 20 to electrically connect the TFT array substrate 10 and the counter substrate 20 with each other. As shown in FIG. 2, the counter substrate 20, which has substantially the same outline as that of the sealing region, is fixed to the TFT array substrate 10 by the sealant 52.

In FIG. 2, on the TFT array substrate 10, an alignment layer is formed on pixel electrodes 9a on which TFTs to switch pixels and lines, such as scanning lines and data lines, have been formed. On the other hand, on the counter substrate 20, in addition to the counter electrode 21, an alignment layer is formed as the outermost layer. The liquid crystal layer 50 is formed of, for example, one nematic liquid crystal or a mixture of several types of nematic liquid crystals, and is in a predetermined alignment state between the pair of alignment layers.

Additionally, on the TFT array substrate 10 shown in FIGS. 1 and 2, in addition to the data line drive circuit 101, the scanning line drive circuits 104, etc., a sampling circuit which samples and supplies image signals to the data lines, a pre-charge circuit which supplies pre-charging signals at a predetermined voltage level to a plurality of data lines prior to image signals, an inspection circuit to inspect the quality and defects, etc., of the electro-optical device during fabrication and at the time of shipment, and other circuits may be formed.

Instead of placing the data line drive circuit 101 and the scanning line drive circuits 104 on the TFT array substrate 10, they may be electrically and mechanically connected, for example, to a driving LSI mounted on a Tape Automated Bonding (TAB) substrate through an anisotropic conductive film provided in the periphery of the TFT array substrate 10. Depending the operation mode, such as a Twisted Nematic (TN) mode, a Vertically Aligned (VA) mode, or a Polymer Dispersed Liquid Crystal (PDLC) mode, and a normally white or normally black mode, polarizing films, retardation films, polarizing plates, etc., are placed in the predetermined directions on the counter substrate 20 at the side in which incident light enters and on the TFT array substrate 10 at the side from which light is emitted.

(First Embodiment)

Next, in an electro-optical device having the overall structure described above, the structure and effect of the shading film provided on the counter substrate body will be described with reference to the drawings.

Figure 3:
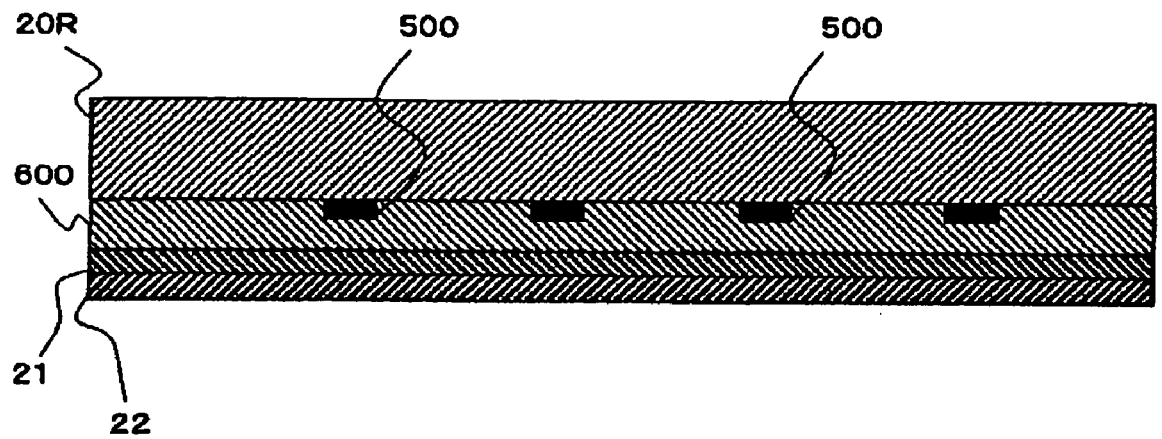
FIG. 3 is an enlarged sectional view showing a circled section indicated by the symbol CR in FIG. 2.

The structure of a shading film 500 in a first embodiment will be described with reference to FIGS. 2 and 3. FIG. 3 is an enlarged sectional view showing a circled section indicated by the symbol CR in FIG. 2.

The shading film 500 in the first embodiment is embedded in the counter substrate 20 as shown in FIGS. 2 and 3. Herein, "embedded" means that, as shown in FIG. 3, after the shading film 500 is formed on the surface of the counter substrate body 20R, an overcoat layer 600 is formed thereon. The overcoat layer 600 is formed of, for example, an acrylic resin or an epoxy resin. The thickness of the overcoat layer 600 is, for example, approximately 0.5 to 2 μm.

The surface of the overcoat layer 600 is planarized by CMP or a SOG film formation process. Thereby, steps resulting from the formation of the shading film 500 do not appear on the surface of the overcoat layer 600. In FIG. 3, a counter electrode 21 and an alignment layer 22 are further formed on top of the overcoat layer 600. In the first embodiment, the counter electrode 21 corresponds to "the other display electrode" of the present invention, and the pixel electrodes 9a correspond to "the display electrodes" of the present invention.

The shading film 500 has a grid pattern when shown in a plan view. The grid pattern corresponds to the pixel electrodes 9a arrayed in a matrix on the TFT array substrate 10, and in the shading film 500, vertical and horizontal bands are placed orthogonal to each other so as to cover the spaces between the pixel electrodes 9a. Consequently, the shading film 500 reduces or prevents light from leaking through the spaces between the pixels, thus enhancing the image contrast.

However, the present invention is not limited to the case in which the shading film 500 has the grid pattern as described above. For example, the shading film 500 may have a striped pattern or any other type of patterns.

In this embodiment, in addition to the enhancement in the contrast between the pixels, the shading film 500 also reduces or prevents light from entering the channel regions of the semiconductor layers constituting the TFTs, thus reducing or preventing improper operations and a decrease in image quality due to the generation of photo leakage current. In such a case, besides the shading film 500, the lower shading film, data lines, capacitor lines (all of which will be described below), etc., also function as elements which display the shading function.

As described above, in the structure in which the shading film 500 is embedded in the counter substrate 20, as shown in FIG. 3, the height of steps or irregularities resulting from the formation of the shading film can be decreased considerably compared with the related art case.

Consequently, cracking can be reduced or prevented in the counter electrode 21, coating defects do not occur in the alignment layer, and rubbing treatment can be performed uniformly over the alignment layer. The decrease in the step height makes it possible to narrow the thickness of the liquid crystal layer 50, and as a result, the electro-optical device can be miniaturized. That is, in the electro-optical device in the first embodiment, undesirable effects of the steps or irregularities resulting from the formation of the shading film can be effectively reduced or prevented.

(Second Embodiment)

Figure 4:
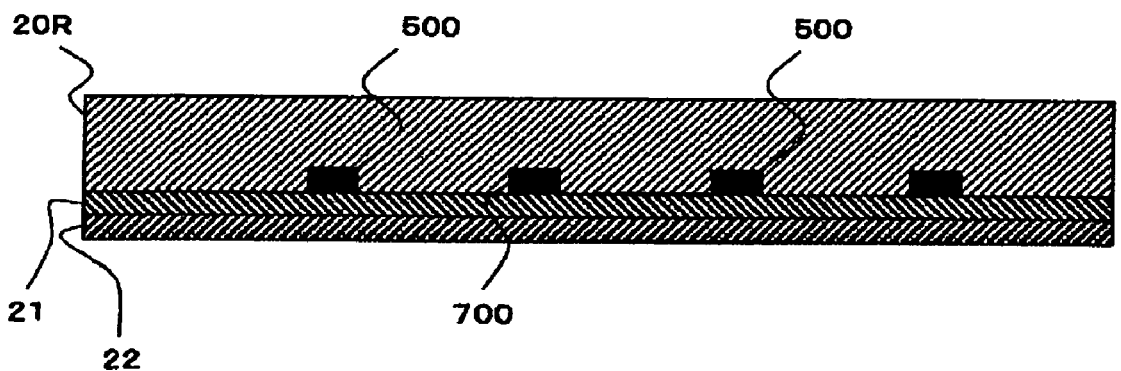
FIG. 4 is an enlarged sectional view showing a similar section to that in FIG. 3 in an embodiment in which a shading film is placed in recesses formed in a counter substrate body.

A second embodiment of the present invention will be described with reference to FIG. 4. FIG. 4 is an enlarged sectional view similar to FIG. 3, but shows a different structure. In the second embodiment, the shading film 500 is embedded in the counter substrate 20 in such a manner in which recesses 700 are formed in the surface of the counter substrate body 20R, and the shading film 500 is formed in the recesses 700. In this embodiment, as will be also described with respect to the fabrication method, for example, the recesses 700 are formed in the counter substrate body 20R in a predetermined pattern preliminarily, and then a material for the shading film 500 is deposited in the recesses 700 by sputtering or the like. In the second embodiment, in the same manner as that in the first embodiment, the shading film 500 typically has a grid pattern, and in such a case, the recesses 700 are also formed in a grid pattern. The counter substrate body 20R, which may also be applied to other embodiments, is a transparent substrate, such as a glass substrate formed of quartz glass, neoceram, or the like, or a plastic substrate. The counter substrate body 20R may also be formed of the same material as or a different material from that for the TFT array substrate 10.

As described above, in the electro-optical device in the second embodiment, since the shading film 500 is embedded in the recesses formed in the surface of the counter substrate body 20R, a flatter surface can be obtained, and the effects in the first embodiment can be more reliably produced.

In the second embodiment, it is also more effective to perform the planarization treatment, such as CMP or a SOG film formation process, described in the first embodiment before the formation of the counter electrode 21, etc.

In the second embodiment, the shading film 500 is entirely embedded in the counter substrate body 20R. However, the present invention is not limited to such a structure. That is, the shading film 500 may be partially embedded in the counter substrate body 20R. In such a structure, the undesirable effects of the steps can be reduced or prevented at least partially, and a considerable effect can be produced.

Figure 5:
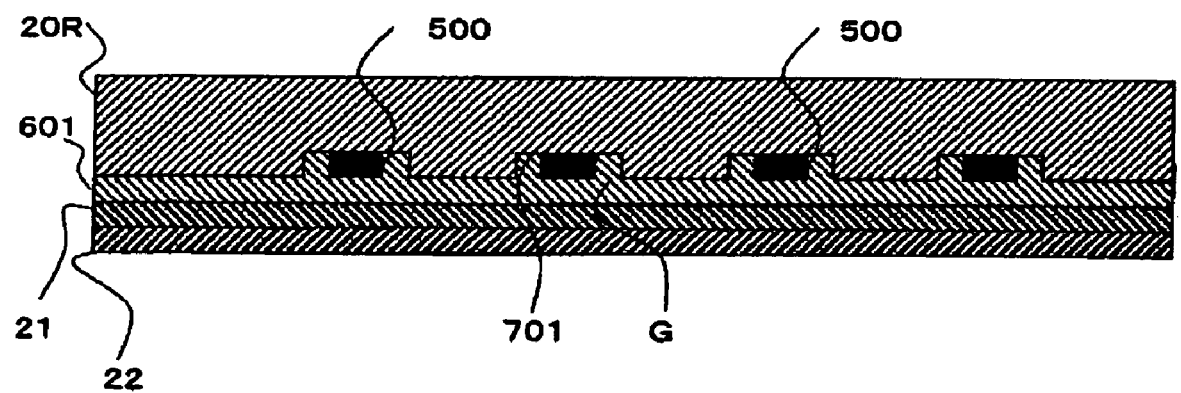
FIG. 5 is an enlarged sectional view showing a similar section to that in FIG. 4 in an embodiment in which a gap lies between a recess and a shading film.

In the second embodiment, although FIG. 4 shows a structure in which the shading film 500 is embedded in the recesses 700 without a gap, the present invention is not limited to such a structure. For example, as shown in FIG. 5, a gap G may be present between the shading film 500 and a recess 701. Such a structure may be produced when the coverage for the recess 701 is insufficient when the shading film 500 is formed. Conversely, the structure shown in FIG. 4 in the second embodiment can be obtained by a special fabrication process, such as a damascene process.

In the structure shown in FIG. 5, preferably, an overcoat layer 601 is formed on top of the counter substrate body 20R and the shading film 500. Although not shown in FIG. 5, more preferably, a SOG film or the like is formed on the overcoat layer 601. Consequently, similar to the first and second embodiments, the entire surfaces of the counter electrode 21 and the alignment layer 22 can be planarized.

A structure in which a silicate glass film, such as an NSG film, is formed between the overcoat layer 601 and the SOG film is also embraced in the present invention.

In the structure shown in FIG. 4 in which no gap G is present between the shading film 500 and the recesses 700, an overcoat layer 601, a SOG film, etc., may be formed depending on the case. The reason for this is that by this way, planarization is also expected and the planarized surface is more reliably obtained.

(Third Embodiment)

Figure 6:
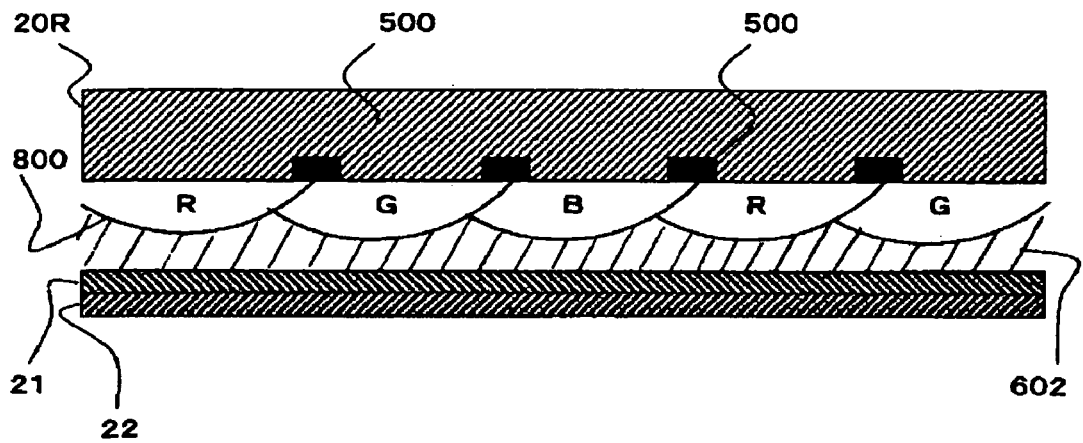
FIG. 6 is an enlarged sectional view showing a similar section to that in FIG. 4 in an embodiment in which a color filter and an overcoat layer are provided above a shading film.

A third embodiment of the present invention will be described with reference to FIG. 6. FIG. 6 is an enlarged sectional view similar to FIG. 4, but shows a different structure. An electro-optical device shown in FIG. 6 differs from the electro-optical device shown in FIG. 4 in that a color filter 800 is provided on top of the shading film 500 and an overcoat layer 602 is provided on top of the color filter 800.

The color filter 800 is composed of R, G, and B colored polymer materials or the like, and the individual colors correspond to the pixels. The color filter 800 may be formed by a dying method or pigment dispersion method in which R, G, and B colored layer patterns are obtained by photolithography, or by a printing method or electrodeposition method in which colored patterns are obtained by printing or electrodeposition. By the presence of such a color filter 800, the individual colors, R, G, and B corresponding to the pixels can be displayed, and a color image can be displayed in the electro-optical device as a whole.

Additionally, in the color filter 800 shown in FIG. 6, the adjacent R and G layers, G and B layers, and B and R layers are formed so as to overlap with each other. In such a structure, it is possible to form a color filter which can function in the same manner with a smaller area compared with a commonly used type in which the individual color filters are separated from each other, thus being suitable for the miniaturization of the electro-optical device.

In the electro-optical device provided with such a color filter 800, the shading film 500 is arranged at the positions corresponding to the boundaries of the individual colors, R, G, and B. This arrangement prevents color mixing, and a clearer image can be obtained.

Since the color filter 800 in the third embodiment shown in FIG. 6 is formed on the planarized surface in which the shading film 500 is embedded in the counter substrate body 20R described in the second embodiment, the color filter can be formed substantially flatly.

This embodiment is more advantageous over the case in which an overcoat layer 602 is formed after the color filter 800 is formed in the state (conventional state) having steps resulting from the formation of the shading film on the counter substrate body 20R, or in which the overcoat layer 602 is further planarized. That is, in the third embodiment in which an overcoat layer 602 is formed on substantially planarized color filter 800, the surface determined by the overcoat layer 602 is obviously flatter compared with the related art case. Of course, if the overcoat layer 602 is further planarized by CMP, a SOG film formation process, or the like, the electro-optical device can be fabricated more efficiently and easily compared with the related art case.

In the third embodiment, the color filter 800 and the overcoat layer 602 are provided based on the second embodiment in which the shading film 500 is formed in the recesses 700. However, in the present invention, the similar structure can be formed based on the first embodiment.

(Fourth Embodiment)

Figure 7:
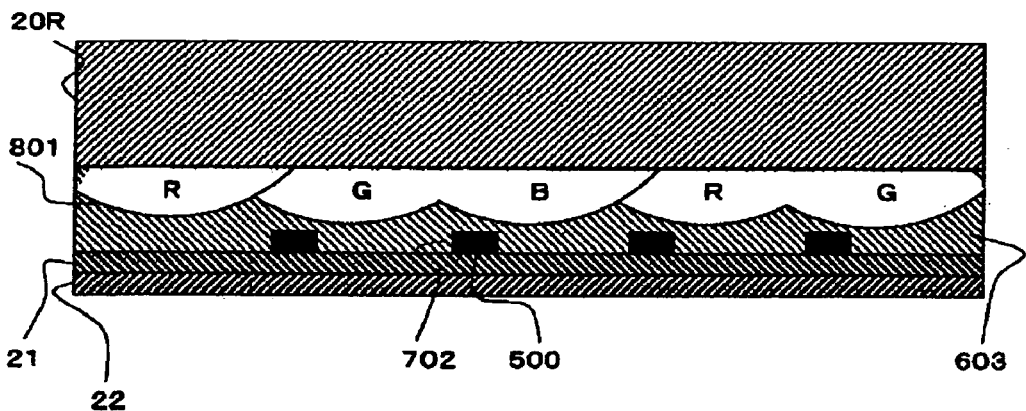
FIG. 7 is an enlarged sectional view showing a similar section to that in FIG. 4 in an embodiment in which a color filter and an overcoat layer are provided as underlayers to a shading film.

A fourth embodiment of the present invention will be described with reference to FIG. 7. FIG. 7 is an enlarged sectional view similar to FIG. 6, but shows a different structure. An electro-optical device shown in FIG. 7 differs from the electro-optical device shown in FIG. 6 in that a color filter 801 and an overcoat layer 603 are formed as underlayers to the shading film 500.

That is, in FIG. 7, the color filter 801 and the overcoat layer 603 are formed in that order on the counter substrate body 20R, and then the shading film 500 is formed. Recesses 702 are formed in the overcoat layer 603, and the shading film 500 is formed in the recesses 702. The overcoat layer 603 is subjected to planarization treatment, which may be performed before the recesses 702 are formed or, as will be described below with respect to the fabrication method, may be performed simultaneously with the formation of the shading film 500 in the recesses 702 after the recesses 702 are formed.

In such a structure, of course, undesirable effects of the steps resulting from the shading film can be eliminated. "The overcoat layer 603" in the fourth embodiment corresponds to an example of "the interlayer insulating film" of the present invention.

Although the shading film 500 is formed in the recesses 702 in the fourth embodiment, the shading film 500 may be formed directly on the overcoat layer 603 without forming the recesses 702 in the manner similar to that in the first embodiment depending on the case.

(Fifth Embodiment)

Figure 8:
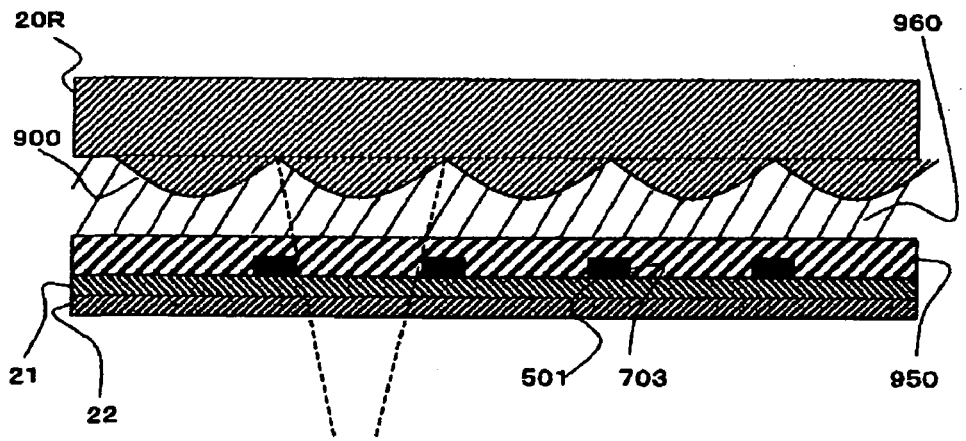
FIG. 8 is an enlarged sectional view showing a similar section to that in FIG. 4 in an embodiment in which microlenses and a cover glass are provided as underlayers to a shading film.

A fifth embodiment of the present invention will be described with reference to FIG. 8. FIG. 8 is an enlarged sectional view similar to FIG. 4, but shows a different structure. The electro-optical device shown in FIG. 8 differs from the electro-optical device shown in FIG. 6 in that an array of microlenses 900 is provided. As shown in FIG. 8, the array of microlenses 900 is formed as the underlayer to a cover glass 950 and on the surface of the counter substrate body 20R. The cover glass 950 is bonded with the microlenses 900 and the counter substrate body 20R by an adhesive layer 960 containing an appropriate adhesive, etc. The adhesive layer 960 is not always applied to the entire surface of the counter substrate body 20R as shown in FIG. 8, and in some cases, the adhesive layer 960 may be applied to the peripheral region only. The shading film 500 is formed in the recesses 703 formed in the cover glass 950, and a counter electrode 21 and an alignment layer 22 are formed on top thereof.

As shown in FIG. 8, each of the elements of the array of microlenses 900 (each microlens) is substantially shaped like a dome, and the individual elements correspond to the individual pixels. The microlenses 900 may be formed, for example, in a method in which a resist applied over the entire surface of the counter substrate body 20R is subjected to exposure (photolithography) and heat treatment, etc., so as to form a resist film having substantially dome-shaped parts arrayed in a matrix, and using this as a mask, etching is performed on the entire surface of the counter substrate body 20R, and thus the shape of the resist film is transferred to the entire surface of the counter substrate body 20R. Since the microlens 900 enables light entering from above in FIG. 8 to be focused in the beam-condensing region (not shown in FIG. 8) on the pixel electrode 9a, as indicated by dashed lines shown in FIG. 8, utilization of the incident light can be enhanced.

In such a structure, it is also possible to eliminate the undesirable effects of the steps resulting from the shading film. "The cover glass 950" in the fifth embodiment corresponds to an example of "the interlayer insulating film" of the present invention. Although the microlens shown in FIG. 8 is a convex lens with respect to the liquid crystal layer, the microlens may be a concave lens, or a combination of a convex lens and a concave lens.

(Specific Examples of Shading Films)

Specific examples of shading films in the individual embodiments will be described below. The three structures shown in FIGS. 9 to 11 are taken as the specific examples.

Figure 9:
FIG. 9 is a schematic showing a specific example of a shading film which has a single-layer structure composed of only one material.

First, as shown in FIG. 9, a shading film 500 is a single-layered film formed of one material. Examples of the material include metallic chromium (Cr), a resin black in which carbon (C) or titanium (Ti) is dispersed in a photoresist, and metallic materials, such as nickel (Ni).

Figure 10:
FIG. 10 is a schematic showing a specific example of a shading film which has a two-layer structure composed of two materials.

Next, as shown in FIG. 10, a shading film 501 having a two-layered structure composed of two materials may be used. For example, a two-layered structure formed of metallic chromium (Cr) and chromium oxide ($Cr_2O_3$) may be used. In such a case, the shading film 501 is for low reflectance use and the shading performance is exhibited mainly by absorbing incident light.

Figure 11:
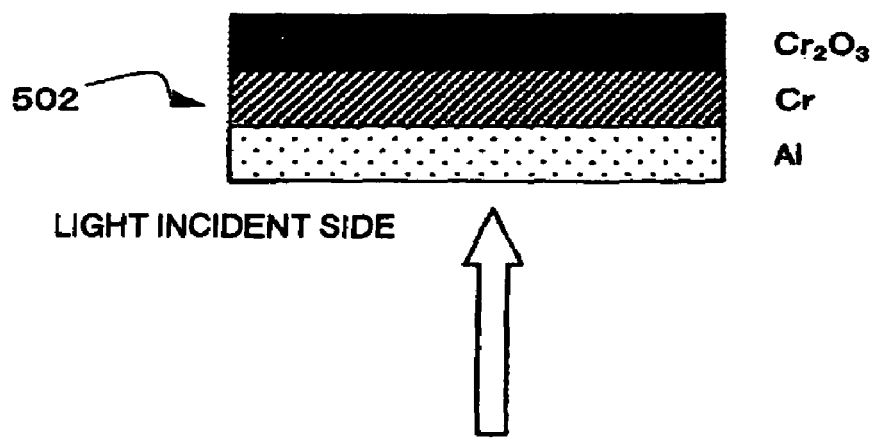
FIG. 11 is a schematic showing a specific example of a shading film which has a three-layer structure composed of three materials.

Furthermore, as shown in FIG. 11, a shading film 502 having a three-layered structure formed of three materials may be used. For example, a three-layered structure formed of aluminum (Al), chromium (Cr), and chromium oxide ($Cr_2O_3$) deposited in that order from the light incident side may be used. The shading film 502 has a thickness of, for example, approximately 400 to 500 nm.

In the shading film 502, when the Al layer is considered as the incident side, most of the incident light is reflected by the Al layer having a extremely high reflective power, and accumulation of useless heat generated by the absorption of light does not occur in the shading film or in the device, and also, feeble light passing through the Al layer is blocked by the Cr layer and the $Cr_2O_3$ layer, thus exhibiting very high shading performance.

The three-layered structure composed of the combination of materials described above has an advantage in that it is easily fabricated, in addition to its very high shading performance. The reason for this is that, as a combination of a high reflectance material and a low reflectance material, if an Al layer and a $Cr_2O_3$ layer or the like are used to form a BM pattern, the formation is relatively difficult in consideration of the affinity between both materials. Therefore, by first forming a Cr layer on an Al base layer, and then forming a $Cr_2O_3$ layer by oxidizing the Cr layer, a shading film having a high reflectance layer and a low reflectance layer can be easily and reliably formed.

In any case, the present invention is applicable to the shading film 500 formed of one layer (refer to FIGS. 1 and 2) and also applicable to the multilayered shading films 501 and 502. Since the height of the multilayered shading film 501 or 502 is generally larger than that of the single-layered shading film 500, the advantage of the present invention that the undesirable effects of the steps resulting from the formation of the shading film can be reduced or eliminated is more effectively exhibited.

(Circuit Configuration and Operation of Electro-optical Device and Detailed Structure of Pixel Region)

With respect to the electro-optical device described above, the circuit configuration and operation thereof and the structure of the pixel region will be described below with reference to FIGS. 12, 13, and 14.

Figure 12:
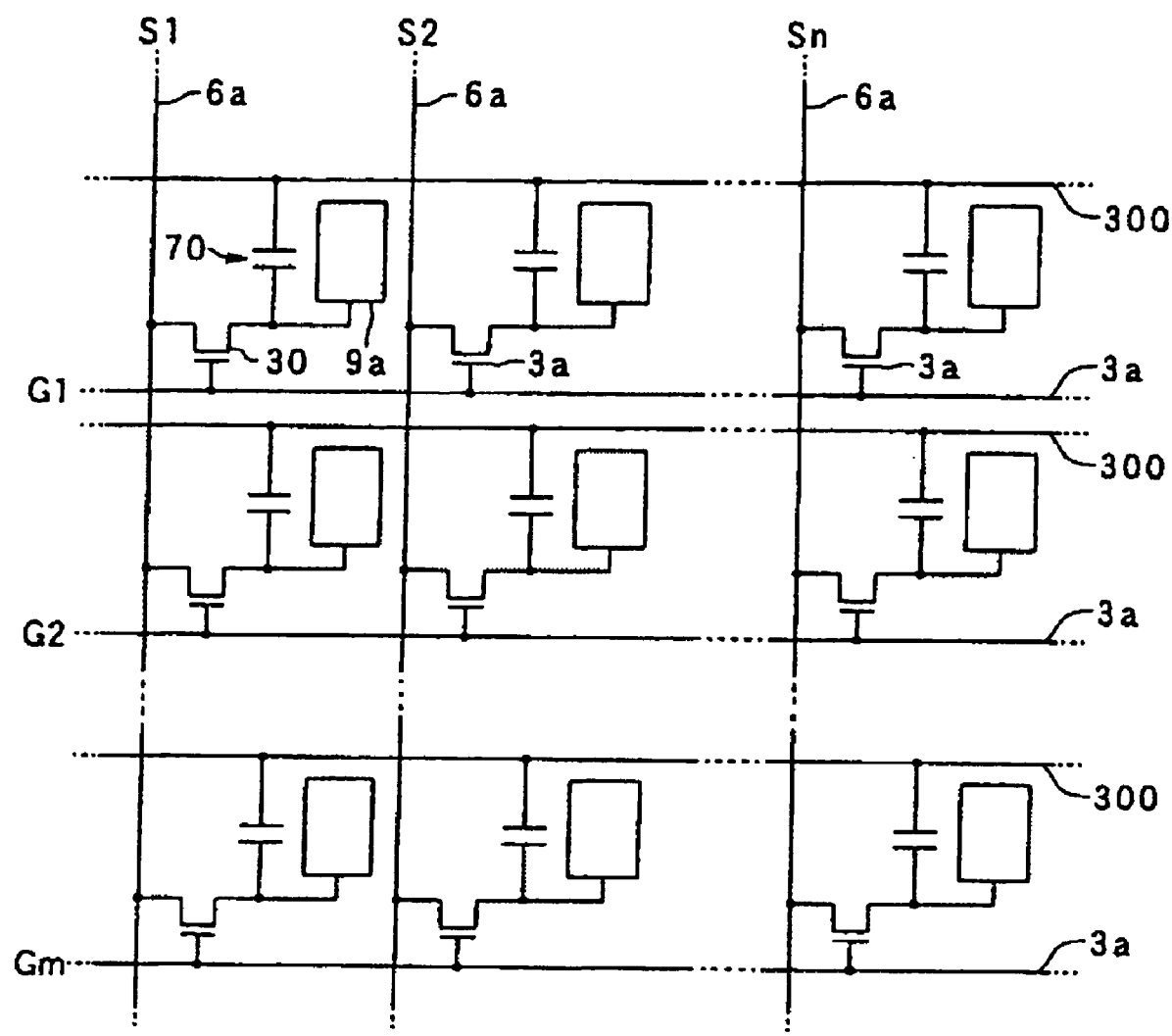
FIG. 12 is a schematic of a circuit diagram showing an equivalent circuit including various elements, lines, etc.,
provided on a plurality of pixels formed in a matrix which constitute the image display region in an electro-optical device in an embodiment of the present invention.

FIG. 12 is a circuit diagram showing an equivalent circuit including various elements, lines, etc., provided on a plurality of pixels formed in a matrix which constitute the image display region in an electro-optical device.

In each of the plurality of pixels formed in a matrix which constitute the image display region of the electro-optical device in this embodiment, a pixel electrode 9a and a TFT 30 to switch the pixel electrode 9a are formed. A data line 6a is electrically connected to the source of the TFT 30. Image signals S1, S2, . . . , Sn to be written into the data lines 6a may be supplied in that order line by line, or the image signals may be supplied to a plurality of data lines 6a adjacent to each other group by group.

A scanning line 3a is electrically connected to the gate of the TFT 30, and scanning signals G1, G2, . . . , Gm are supplied in that order line by line in a pulsed form. The pixel electrode 9a is electrically connected to the drain of the TFT 30. The pixel electrodes 9a write the image signals S1, S2, . . . , Sn supplied from the data lines 6a at a predetermined timing by turning off the TFTs 30 which are switching elements for a certain period.

The image signals S1, S2, . . . , Sn written at a predetermined level into the liquid crystal which is an example of the electro-optical material through the pixel electrodes 9a are retained for a certain period in the spaces between the liquid crystal and the counter electrode formed on the counter substrate. Since the alignment of the molecular assembly and the order of the liquid crystal are changed in response to the level of voltage applied, light is modulated, thus achieving a gray scale display. In the normally white mode, the transmittance with respect to incident light is decreased in response to the voltage applied for each pixel, and in the normally black mode, the transmittance with respect to incident light is increased in response to the voltage applied for each pixel, and overall, light having a contrast corresponding to the image signals is emitted from the electro-optical device.

In order to reduce or avoid the leakage of the retained image signals, storage capacitors 70 are added parallel to the liquid crystal capacitors formed between the pixel electrodes 9a and the counter electrode. Capacitor lines 300, which include capacitor electrodes on the fixed potential side of the storage capacitors and which are fixed at a constant potential, are provided along the scanning lines 3a.

Next, the structure of the pixel region of the electro-optical device in this embodiment will be described with reference to FIGS. 13 and 14. FIG. 13 is a plan view showing a plurality of pixels placed adjacent to each other in an electro-optical device provided with data lines, scanning lines, pixel electrodes, etc., and FIG. 14 is a sectional view taken along plane A–A' of FIG. 13. In FIG. 14, in order to make the individual layers and elements recognizable in the drawing, different scale sizes are used for the individual layers and elements.

Figure 13:
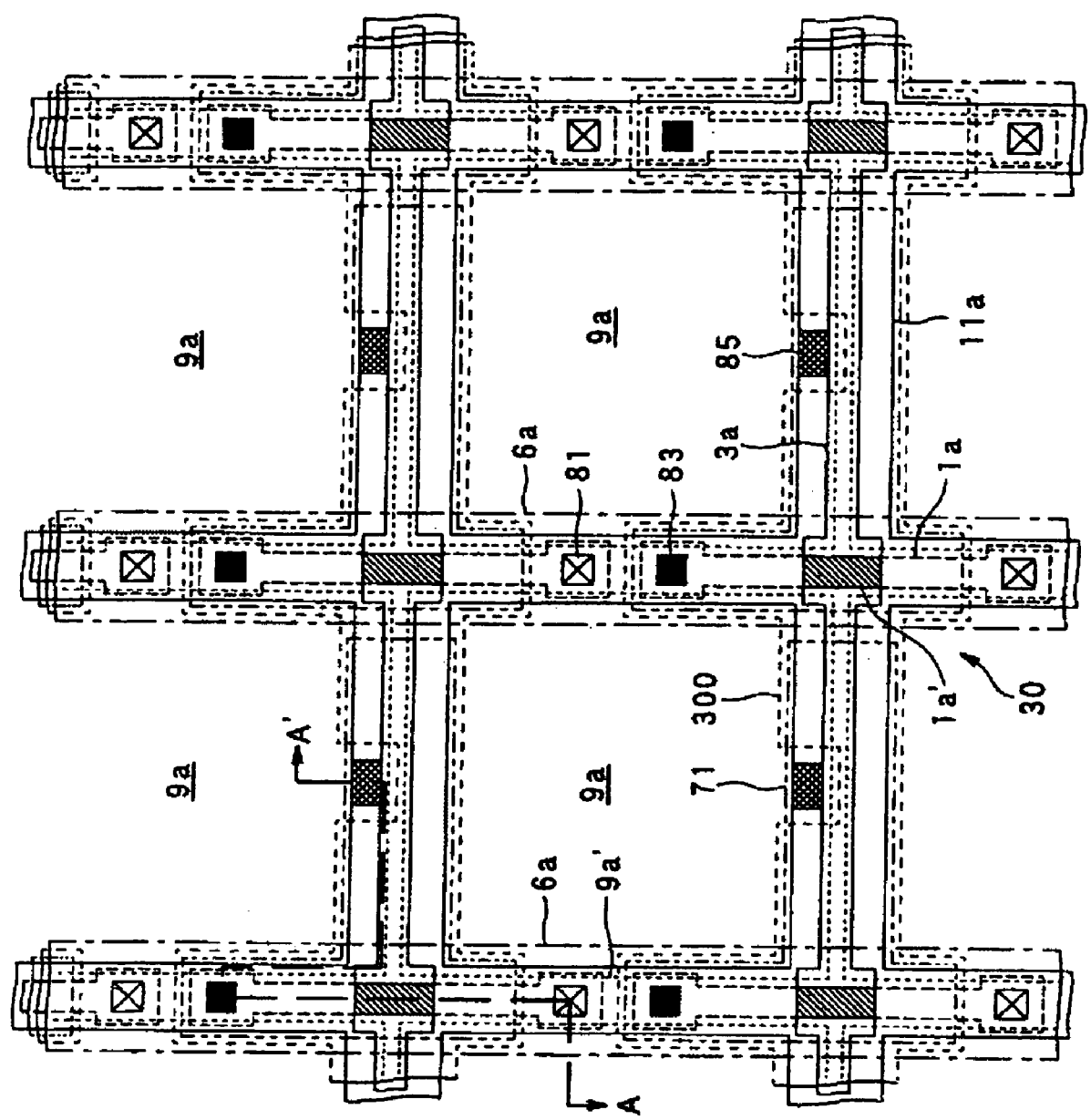
FIG. 13 is a plan view showing a plurality of pixels placed adjacent to each other in a TFT array substrate provided with data lines, scanning lines, pixel electrodes, etc., in an electro-optical device in an embodiment of the present invention.
Figure 14:
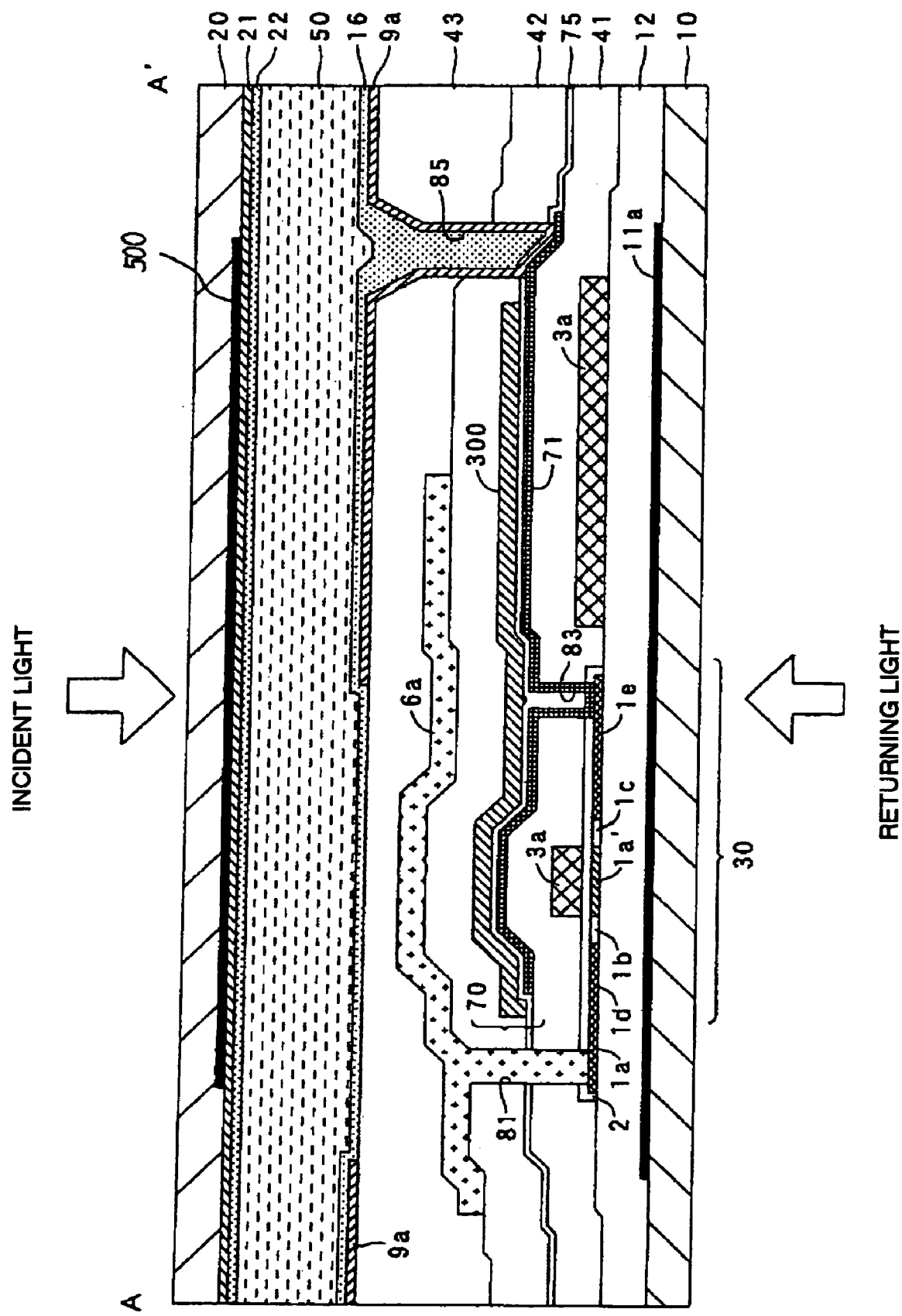
FIG. 14 is a sectional view taken along plane A–A' of FIG. 13.

In FIGS. 13 and 14, the electro-optical device is provided with the TFT array substrate 10 and the counter substrate 20 which have been described above. The TFT array substrate body 10R is formed of, for example, a quartz substrate, a glass substrate, or a silicon substrate, and the counter substrate body 20R is composed of, for example, a glass substrate or a quartz substrate.

In FIG. 13, a plurality of transparent pixel electrodes 9a (the outline thereof is indicated by the dashed lines 9a') are formed in a matrix on the TFT array substrate 10 of the electro-optical device. Data lines 6a and scanning lines 3a are placed along the boundaries of the pixel electrodes 9a vertically and horizontally, respectively.

The scanning line 3a is placed so as to face channel regions 1a' which are the hatched sections shown in FIG. 13, and a portion of the scanning line 3a functions as a gate electrode. At each intersection of the scanning lines 3a and the data lines 6a, A TFT 30 to switch the pixel is provided in which the scanning line 3a acting as the gate electrode is placed so as to face the channel region 1a'. As shown in FIG. 14, the TFT 30 has a lightly doped drain (LDD) structure. The TFT 30 includes the scanning line 3a, the channel region 1a' of a semiconductor layer 1a which is formed of, for example, a polysilicon film and in which a channel is formed by an electric field from the scanning line 3a, and an insulating film 2 including a gate insulating film which insulates the scanning line 3a from the semiconductor layer 1a, and the TFT 30 also includes a low-concentration source region 1b, a low-concentration drain region 1c, a high-concentration source region 1d, and a high-concentration drain region 1e of the semiconductor layer 1a.

The data line 6a which is placed orthogonal to the scanning line 3a is electrically connected to the high-concentration source region 1d through a contact hole 81. Additionally, an intermediary layer formed of the same film as an intermediary layer 71 which will be described below may be formed, and the data line 6a and the high-concentration source region 1d may be electrically connected to each other through the intermediary layer and two contact holes.

In FIG. 14, the storage capacitor 70 is formed in which the intermediary layer 71 functioning as the capacitor electrode on the pixel potential side, which capacitor electrode connects to the high-concentration drain region 1e and the pixel electrodes 9a, and a portion of the capacitor line 300 functioning as the capacitor electrode (on the fixed potential side) are placed so as to face each other with a dielectric film 75 therebetween.

The capacitor lines 300 extend along the scanning lines 3a in a striped pattern when viewed in a plan view, and at the sections overlapping with the TFTs 30, the capacitor lines 300 protrude upward and downward as shown in FIG. 13. The capacitor line 300 is preferably formed of a conductive shading film containing a high-melting-point metal, and functions as a shading layer to shield the TFTs 30 from incident light, in addition to the function as the capacitor electrode on the fixed potential side of the storage capacitor 70. The capacitor line 300 preferably extends from the image display region 10a in which the pixel electrodes 9a are placed to the periphery thereof, and is electrically connected to a constant potential source so as to have a fixed potential. As the constant potential source, a constant potential source of positive or negative power supplied to the data line drive circuit 101, or a constant potential supplied to the counter electrode 21 of the counter substrate 20 may be used.

On the other hand, the pixel electrode 9a is one of the electrodes to apply a predetermined voltage to the liquid crystal layer 50. As shown in FIG. 14, the pixel electrode 9a is electrically connected to the high-concentration drain region 1e of the semiconductor layer 1a through the contact holes 85 and 83 with the intermediary layer 71 therebetween. The pixel electrode 9a is formed of a transparent conductive film, such as an ITO film.

An alignment layer 16 which has been subjected to predetermined alignment treatment, such as rubbing treatment, is provided on the pixel electrode 9a. The alignment layer 16 is formed of a transparent organic film, such as a polyimide film.

In the electro-optical device shown in FIGS. 13 and 14, a lower shading film 11a is also provided below the TFTs 30. The lower shading film 11a is formed into a grid shape by patterning so as to delimit the aperture regions of the individual pixels. The aperture regions are also delimited by the data lines 6*a* extending vertically and the capacitor lines 300 extending horizontally which intersect each other in FIG. 13.

An insulating underlayer 12 is provided under the TFTs 30. The insulating underlayer 12 insulates the lower shading film 11*a* from the TFTs 30. Since the insulating underlayer 12 is formed on the entire surface of the TFT array substrate 10, the insulating underlayer 12 also avoids the changes in characteristics of the TFTs 30 to switch pixels due to roughness during surface polishing of the TFT array substrate 10, contaminants remaining after cleaning, etc.

A first interlayer insulating film 41 is formed on the scanning line 3*a*. The contact hole 81 leading to the high-concentration source region 1*d* and the contact hole 83 leading to the high-concentration drain region 1*e* are formed in the first interlayer insulating film 41.

The intermediary layer 71 and the capacitor line 300 are formed on the first interlayer insulating film 41, and a second interlayer insulating film 42 is formed thereon. The contact hole 81 leading to the high-concentration source region 1*d* and the contact hole 85 leading to the intermediary layer 71 are formed in the second interlayer insulating film 42.

The data line 6*a* is formed on the second interlayer insulating film 42, and a planarized third interlayer insulating film 43 is formed thereon. The contact hole 85 leading to the intermediary layer 71 is formed in the third interlayer insulating film 43.

The surface of the third interlayer insulating film 43 is planarized by CMP or the like, thereby reducing alignment defects of the liquid crystal layer 50 due to the steps resulting from various lines and elements placed therebelow.

A counter electrode 21 is formed on the entire surface of the counter substrate 20, and an alignment layer 22 which has been subjected to predetermined alignment treatment, such as rubbing treatment, is provided under the counter electrode 21. The counter electrode 21 is formed of a transparent conductive film, such as an ITO film. The alignment layer 22 is formed of a transparent organic film, such as a polyimide film.

A shading film 500 shaped in a grid pattern is provided on the counter substrate 20 as the underlayer to the counter electrode 21 and the alignment layer 22. As described above, the shading film 500 does not necessarily have a grid shape, and may be formed, for example, in a striped pattern along the scanning lines 3*a*.

In this embodiment, as described above, the shading film 500 is embedded in the counter substrate body 20R or the interlayer insulating film, such as the overcoat layer 603 (refer to the fourth embodiment shown in FIG. 7), the cover glass 950 (refer to the fifth embodiment shown in FIG. 8), formed on the counter substrate body 20R. In the structure shown in FIG. 14, a recess 700 is formed in the counter substrate body 20R, and the shading film 500 is embedded in the recess 700 (corresponding to the second embodiment). Because of such a structure, undesirable effects of steps resulting from the formation of the shading film are not produced or can be reduced in this embodiment.

(Fabrication Method)

Figure 15:
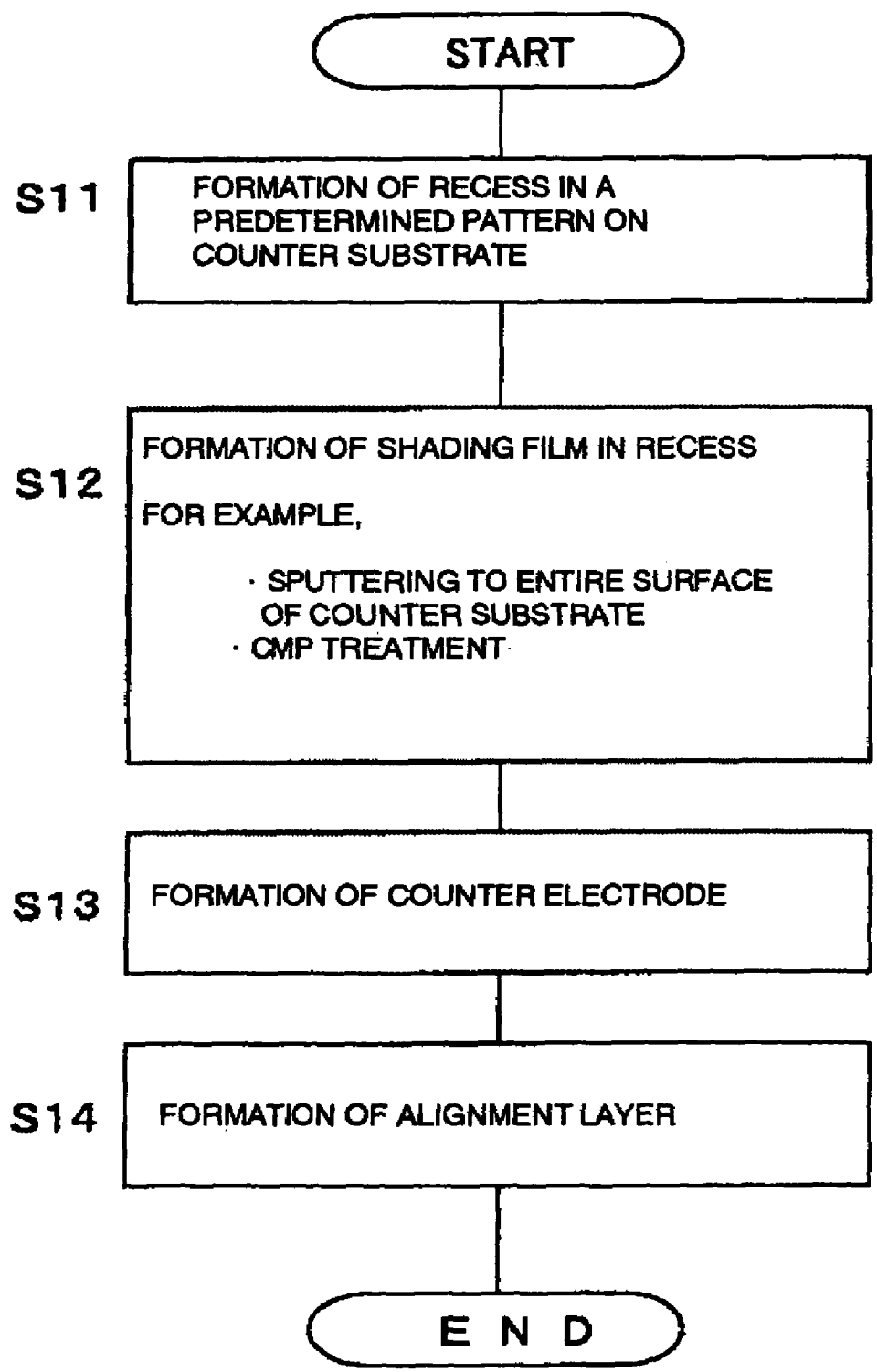
FIG. 15 is a flowchart showing a fabrication process for a counter substrate provided with elements in an electro-optical device in an embodiment of the present invention.

A method for fabricating the electro-optical device according to the second embodiment will be described with reference to the flowchart shown in FIG. 15 and to FIGS. 16 and 17.

First, a counter substrate body 20R is prepared. After the surface of the counter substrate body 20R is cleaned and dried, a recess 700 having a predetermined pattern is formed (step S11). The recess 700 may be formed by a photolithographic process or the like.

Figure 16:
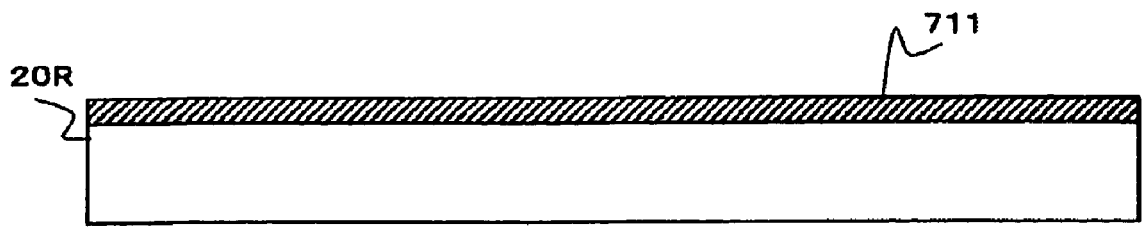
FIGS. 16(a) to 16(d) are schematics which illustrate the step of forming recesses in a counter substrate.
Figure 16:
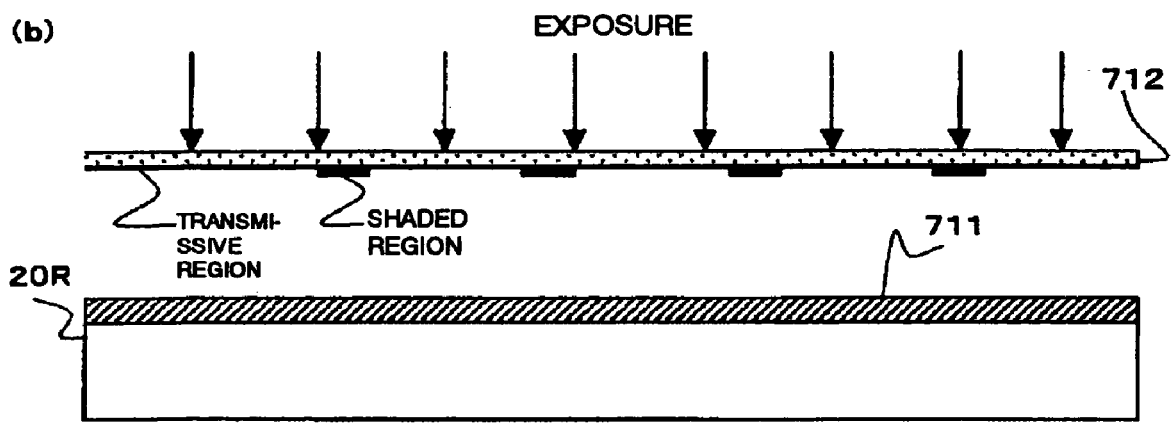
Figure 16:
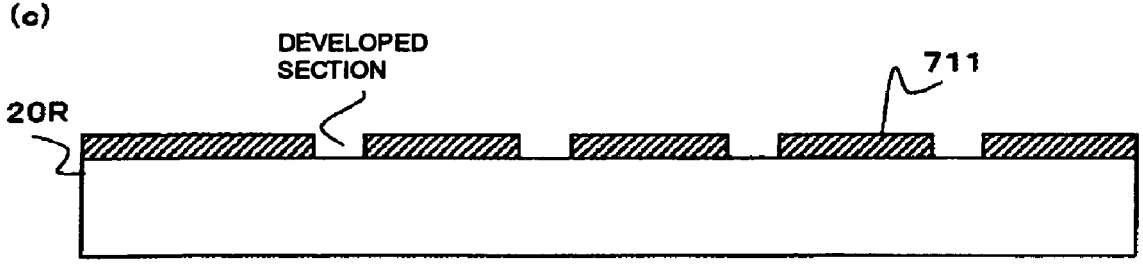
Figure 16:
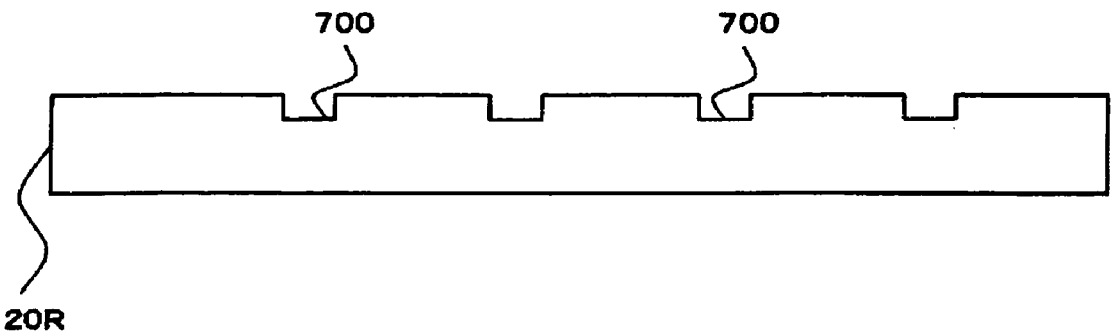

That is, as shown in FIG. 16, after a photoresist 711 is applied to the counter substrate body 20R, followed by pre-baking (FIG. 16(*a*)), exposure is performed by ultraviolet light or the like through a photo mask having the same pattern as that of the recess 700 to be formed (FIG. 16(*b*)). Herein, "the same pattern as that of the recess 700" is, for example, a grid pattern, as described above. Next, the exposed sections are removed, namely, development is performed, followed by post-baking to cure the remaining resist 711 (FIG. 16(*c*)). Lastly, pattern etching is performed using the resist layer as a mask and the resist 711 is removed. The recess 700 having the predetermined pattern is thereby formed (FIG. 16(*d*)). Additionally, although a positive type resist is used in the method described above, a negative type resist may also be used.

Referring back to FIG. 15, the shading film 500 is formed on the counter substrate body 20R provided with the recess 700 (step S12). In order to form the shading film 500, for example, by sputtering or the like, a shading film is formed on the entire surface of the counter substrate body 20R including the sections in which the recess 700 is formed and the sections in which the recess 700 is not formed, and then the shading film in the sections in which the recess 700 is not formed is removed by the photolithographic process or the like described with reference to FIG. 16.

Herein, in this embodiment, as a method for forming (or leaving) the shading film 500 only in the recess 700, a process which is far more effective than the photolithographic process will be proposed. For example, CMP (Chemical Mechanical Polishing) may be mentioned (see step S12). Herein, CMP is a technique in which the surfaces of a substrate and a polishing cloth (pad) are brought into contact with each other while both the substrate and the polishing cloth are rotated or the like, and simultaneously, a polishing liquid (slurry) is supplied to the contact section, and thus the surface of the substrate is planarized by polishing taking advantages of the synergistic effect of both mechanical and chemical actions.

Figure 17:
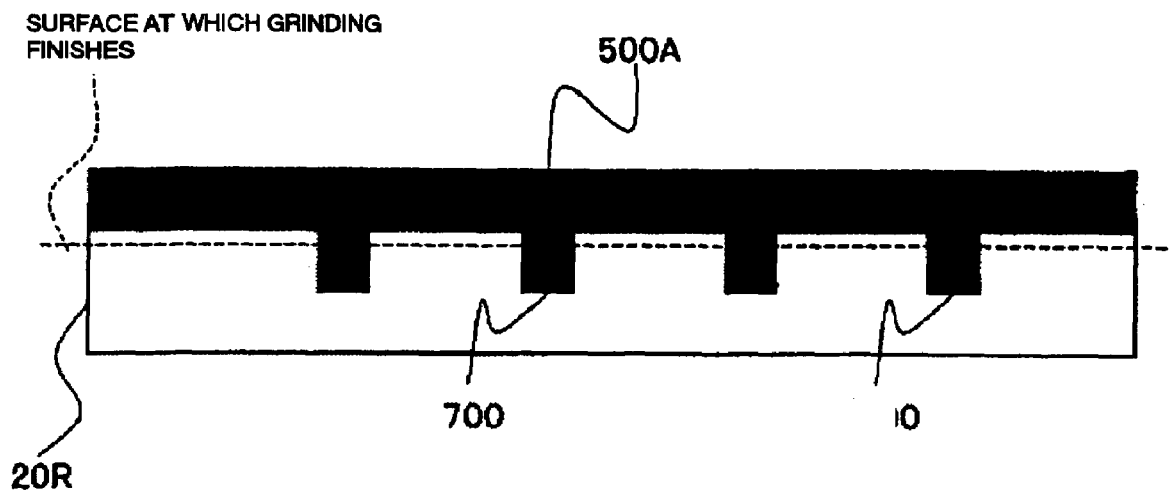
FIGS. 17(a) and 17(b) are schematics which illustrate the steps of forming a shading film over the entire surface of a counter substrate provided with recesses and performing CMP so that the shading film remains only in the recesses and the surface is planarized.
Figure 17:
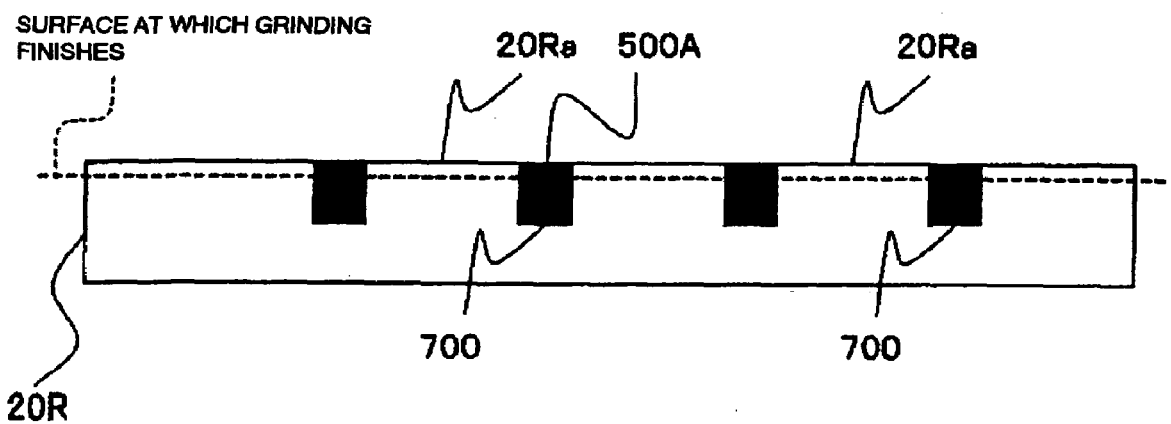

In such a process, as shown in FIG. 17, first, a shading film 500A which is formed over the entire surface of the counter substrate body 20R is polished (FIG. 17(*a*)), and secondly, a surface 20Ra of the counter substrate body 20R other than the sections in which the recess 700 is formed and the shading film 500A inside the recess 700 are polished (FIG. 17(*b*)). Thereby, the structure in which the shading film 500 is formed in the recess 700 only or the structure in which the shading film 500 is embedded in the recess 700 is obtained. By such a process, it is also possible to obtain an extremely flat surface with respect to the counter substrate body 20R in which the shading film 500 is embedded. (Such planarization treatment may be referred to as "a damascene process by CMP".)

In order to completely embed the shading film 500 in the recess 700 without any gaps, for example, reflowing may be combined with the process described above.

Instead of CMP, a spin on glass (SOG) film formation process may be used as the planarization process. Herein, the SOG film formation process is a technique in which an appropriate organic liquid or the like is applied to a substrate while rotating the substrate so that the liquid produces a horizontal surface, and then by solidifying the liquid, a planarized surface is obtained.

When the shading film 500 is formed in the recess 700 so that a gap is present between the shading film 500 and the recess 701 as described with reference to FIG. 5, an overcoat layer 601 may be formed on top of the shading film 500 or a SOG film may be further formed on the overcoat layer 601.

It is also possible to combine the various processes described above (for example, CMP after the formation of the overcoat layer 601) in order to planarize the surface of the counter substrate body 20R in which the shading film 500 is embedded.

In any case, the examples described above, or other examples, such as the one in which an etch back process or the like is used for planarization, are basically embraced in the present invention.

Additionally, when a multilayered shading film is formed as shown in FIG. 10 or 11, the layers are deposited in sequence while the sputtering process is appropriately controlled (for example, sputtering time is controlled) so that the individual layers have the desired thicknesses, and then the various types of planarization treatment may be performed.

After the shading film 500 which is embedded in the counter substrate body 20R is formed and the entire surface thereof is planarized, a counter electrode 21 is formed on top thereof (step S13). The counter electrode 21 may be formed by sputtering or the like using an ITO target. The thickness thereof is preferably approximately 50 to 200 nm.

In the counter electrode 21 thus formed, cracking or the like due to the steps does not occur because the entire surface thereof is flat.

After the counter electrode 21 is formed, an alignment layer 22 is formed on top of the counter electrode 21 (step S14). The alignment layer 22 may be formed, for example, by a method in which after an alignment layer material, such as polyamic acid or a soluble polyimide, is applied by flexographic printing, calcining and firing are performed on the alignment layer material, and finally, rubbing treatment is performed.

Herein, in the rubbing treatment, the surface of the fired alignment layer 22 is rubbed in a predetermine direction by a buffing cloth wound around a metallic roller or the like. By such treatment, the polymer backbone of the polyimide of the alignment layer is drawn in the rubbing direction and the liquid crystal molecules can be aligned in the drawing direction, and thus the molecular orientation of the liquid crystal can be aligned in a predetermined direction. Additionally, after the rubbing treatment is completed, in order to remove tissue slices from the buffing cloth adhering to the surface of the alignment layer 22 and chips scraped off the alignment layer 22 itself, the substrate is dipped in ultrapure water and ultrasonic cleaning is performed, and then drying is performed by exposing the substrate to isopropyl alcohol vapor for draining.

In this embodiment, the rubbing treatment can be performed uniformly on the entire surface of the alignment layer 22. The reason for this is that since the alignment layer 22 is formed on top of the counter electrode 21 which is formed on the planarized counter substrate body 20R and shading film 500, the entire surface of the alignment layer 22 is also flat.

The fabrication of the counter substrate 20 is thereby completed.

Figure 18:
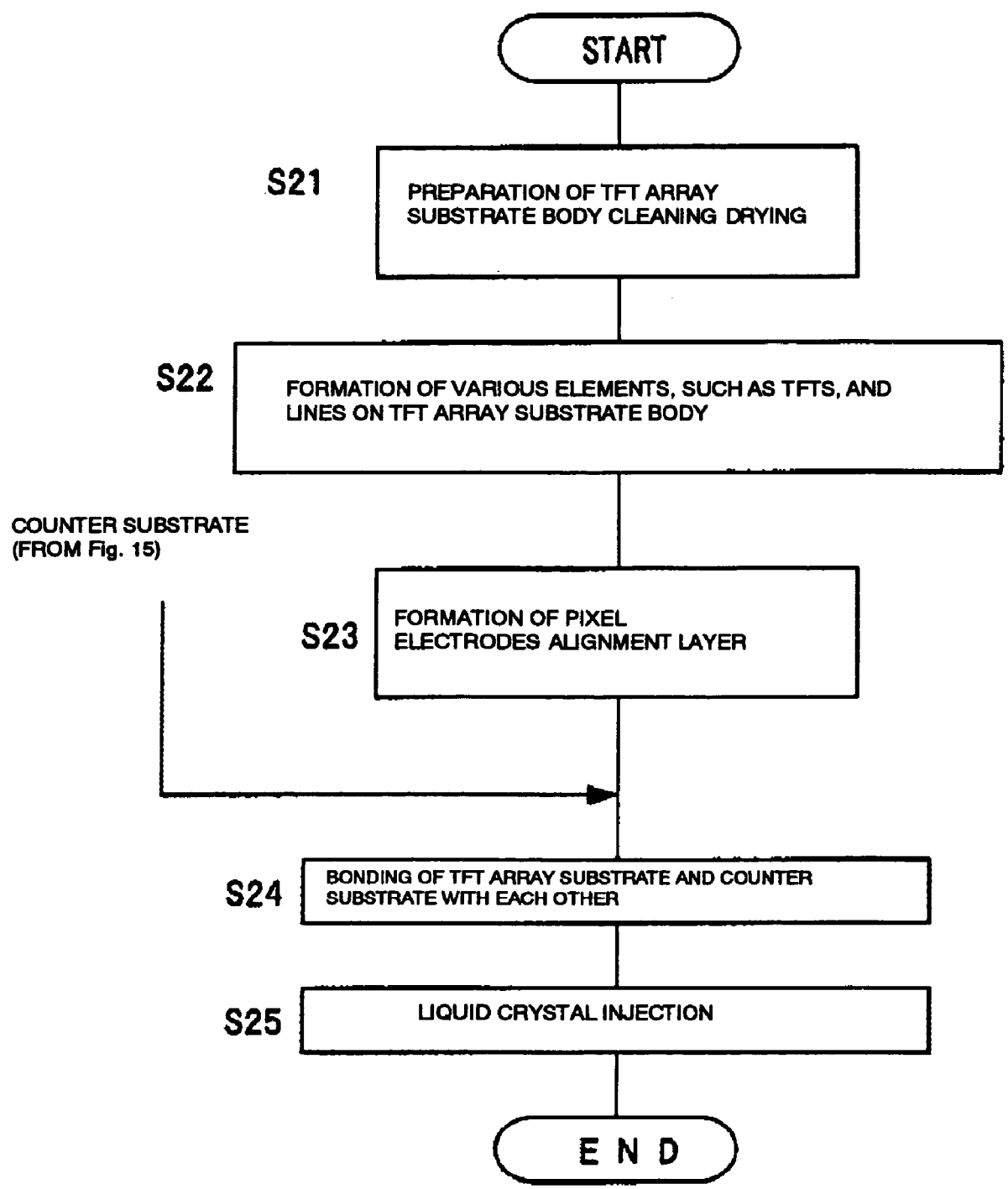
FIG. 18 is a flowchart showing a fabrication process for a TFT array substrate provided with elements in an electro-optical device in an embodiment of the present invention and a fabrication process for the entire electro-optical device.

The TFT array substrate 10 and the electro-optical device are fabricated according to the flowchart shown in FIG. 18.

First, as the TFT array substrate body 10R, for example, a quartz substrate, a glass substrate, or a silicon substrate is prepared, and appropriate cleaning and drying treatment is performed (step S21). Next, on the substrate body 10R, various elements, such as the TFTs 30 and the storage capacitors 70, the lines, the interlayer insulating films 41, 42, and 43, etc., which are shown in FIG. 14, etc., are formed (step S22). The pixel electrodes 9a and the alignment layer 16 are formed (step S23), and the fabrication of the TFT array substrate 10 is thereby completed.

After the TFT array substrate 10 and counter substrate 20 provided with various layers are prepared, the TFT array substrate 10 and the counter substrate 20 are bonded with each other by the sealant 52 shown in FIGS. 1 and 2 so that the upper and lower alignment layers 22 and 16 face each other (step S24). At this stage, in order to maintain a predetermined distance between the two substrates 10 and 20, spacers (not shown in the drawing) are dispersed. Next, a liquid crystal which is, for example, a mixture of several types of nematic liquid crystals, is injected into the space between the TFT array substrate 10 and the counter substrate 20 (step S25). The liquid crystal injection may be performed by a vacuum method or the like.

The electro-optical device is thereby completed.

(Embodiment of Electronic Apparatus)

Figure 19:
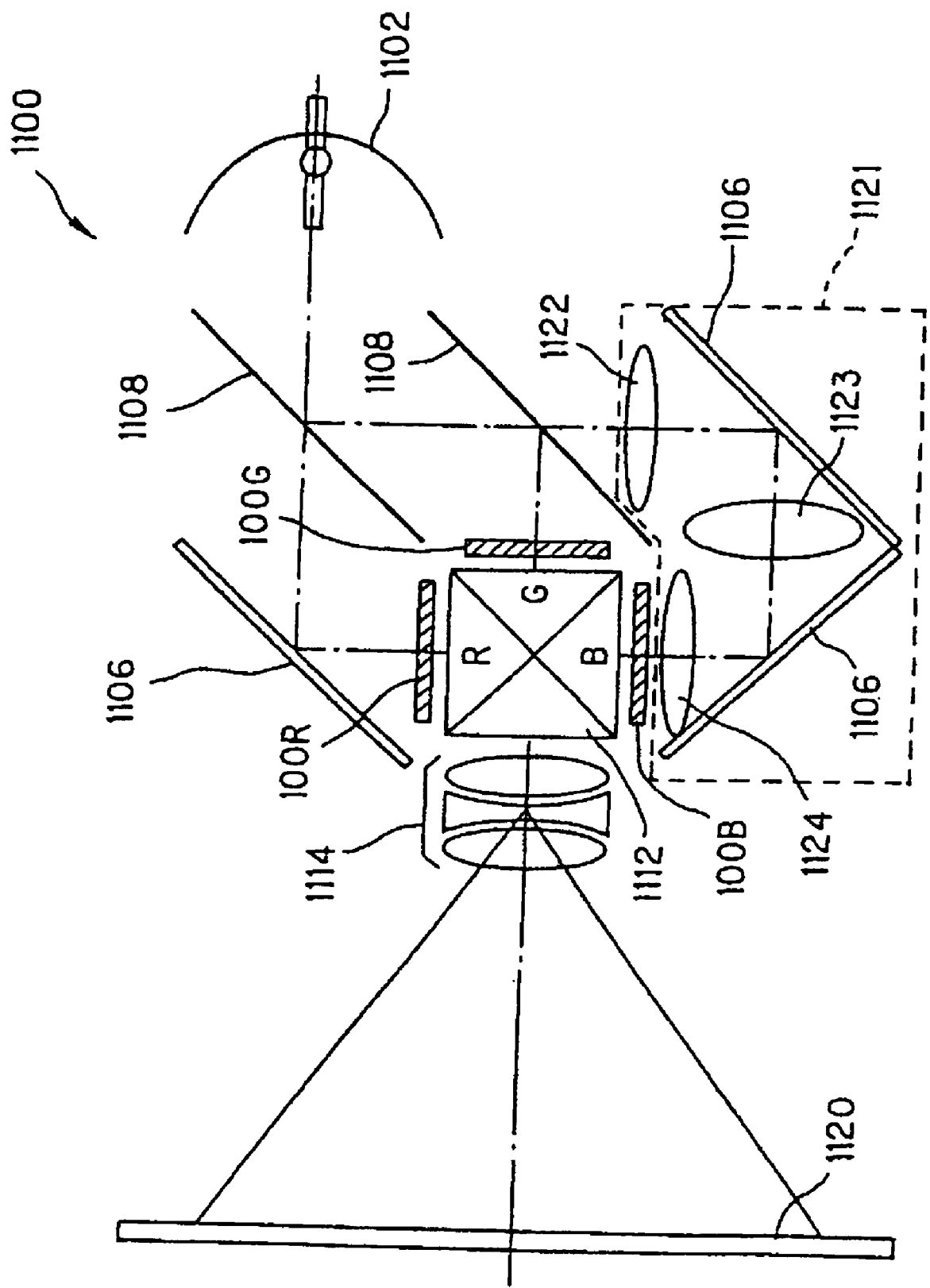
FIG. 19 is a sectional view which schematically shows a color liquid crystal projector as an example of a projection color display device in an embodiment of an electro-optical device of the present invention.

Next, with respect to a projection color display device which is an embodiment of an electronic apparatus in which the liquid crystal device described above is used as a light valve, the overall structure and, in particular, the optical structure will be described. FIG. 19 is a schematic sectional view of the projection color display device.

In FIG. 19, in a liquid crystal projector 1100 which is an example of the projection color display device in this embodiment, three liquid crystal modules, each including a liquid crystal device in which drive circuits are mounted on a TFT array substrate, are used as light valves 100R, 100G, and 100B. In the liquid crystal projector 1100, projection light, which is emitted from a lamp unit 1102 comprising a white light source, such as a metal halide lamp, is separated by three mirrors 1106 and two dichroic mirrors 1108 into three primary color light components R, G, and B. The light components R, G, and B are guided to the light valves 100R, 100G, and 100B corresponding to the individual primary colors, respectively. At this stage, in particular, B light is guided through a relay lens system 1121 formed of an incident side lens 1122, a relay lens 1123, and an emitting side lens 1124 in order to avoid light loss due to its long optical path. The light components corresponding to the primary colors which are modulated by the light valves 100R, 100G, and 100B, respectively, are combined again by a dichroic prism 1112, and then are projected as a color image to a screen 1120 through a projection lens 1114.

Other examples of the electronic apparatuses of the present invention include liquid crystal televisions, mobile phones, electronic pocket diaries, word processors, viewfinder type or monitor-direct-view type video tape recorders, workstations, television telephones, POS terminals, and touch panels, for example.

Additionally, although the active matrix electro-optical devices have been described in the individual embodiments, the present invention is not limited thereto. That is, the present invention is applicable to a so-called "simple matrix" electro-optical device having a structure in which electrode strips are formed on two substrates as electrodes to apply a voltage to an electro-optical material, and the two substrates are placed to face each other so that the electrode strips on the individual substrates intersect each other. The present invention is also applicable to an active matrix electro-optical device which uses TFDs instead of the TFTs 30. Moreover, the present invention is also applicable to an electro-optical device in which one of the substrates is not provided with an alignment layer, such as an EL device or an electrophoretic device, and to an electro-optical device in which one of the substrates is not provided with an electrode.

The present invention is not limited to the embodiments described above. It is to be understood that the present invention is intended to embrace all such alternatives, modifications, and variations as may fall within the spirit and scope of the appended claims and the specification. Electro-optical devices and electronic apparatuses in which such modifications are made are also embraced in the technical field of the present invention.

What is claimed is:

1. An electro-optical device, comprising:
    a pair of substrates including a first substrate and a second substrate;
    an electro-optical material disposed between the pair of substrates;
    the first substrate including:
      a substrate body;
      microlenses provided on a surface of the substrate body facing the electro-optical material;
      a cover glass bonded with the microlenses by an adhesive layer; and
      a shading film having a predetermined pattern, the shading film being flush with a surface of the cover glass facing the electro-optical material;
    display electrodes disposed above the second substrate at a surface facing the electro-optical material; and
    switching elements provided at positions corresponding to the display electrodes and opposed to the shading film.

2. The electro-optical device according to claim 1, the shading film being placed in a recess formed in the cover glass.

3. The electro-optical device according to claim 1, further comprising an alignment layer as an outermost layer formed on the first substrate.

4. The electro-optical device according to claim 1, further comprising a display electrode placed on the first substrate at a surface facing the electro-optical material.

5. An electronic apparatus, comprising:
    the electro-optical device according to claim 1.

6. The electro-optical device according to claim 1, the shading film including a plurality of layers.

7. The electro-optical device according to claim 6, the plurality of layers including at least one of an aluminum layer, a chromium layer, and a chromium oxide layer.

8. An electro-optical device, comprising:
    a pair of substrates including a first substrate and a second substrate;
    an electro-optical material disposed between the pair of substrates;
    microlenses provided on the first substrate;
    a shading film having a predetermined pattern, the shading film being formed on the first substrate at a surface facing the electro-optical material;
    display electrodes disposed on the second substrate at a surface facing the electro-optical material;
    switching elements provided at positions corresponding to the display electrodes; and
    a planarizing layer that is flush with a surface of the shading film provided on the first substrate.

9. The electro-optical device according to claim 8, the shading film being placed in a recess formed in the cover glass.

10. The electro-optical device according to claim 8, further comprising an alignment layer as an outermost layer formed on the first substrate.

11. The electro-optical device according to claim 8, further comprising a display electrode placed on the first substrate at a surface facing the electro-optical material.

12. An electronic apparatus, comprising:
    the electro-optical device according to claim 8.

13. The electro-optical device according to claim 8, the shading film including a plurality of layers.

14. The electro-optical device according to claim 13, the plurality of layers including at least one of an aluminum layer, a chromium layer, and a chromium oxide layer.

* * * * *